(12) United States Patent
Gomez Gutierrez et al.

(10) Patent No.: US 10,733,880 B2
(45) Date of Patent: Aug. 4, 2020

(54) UNMANNED AERIAL VEHICLE TRAFFIC SIGNALS AND RELATED METHODS

(71) Applicant: Intel Corporation, Santa Clara, CA (US)

(72) Inventors: David Gomez Gutierrez, Tlaquepaque (MX); Rafael De La Guardia Gonzalez, Guadalajara (MX); Jose I. Parra Vilchis, Gaudalajara (MX); Willem M. Beltman, West Linn, OR (US); Bradley A. Jackson, Hillsboro, OR (US); Joshua Triska, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 541 days.

(21) Appl. No.: 15/387,239

(22) Filed: Dec. 21, 2016

(65) Prior Publication Data

US 2018/0174448 A1    Jun. 21, 2018

(51) Int. Cl.
    *G08G 1/08*     (2006.01)
    *G08G 1/081*    (2006.01)
    *G08G 1/095*    (2006.01)
    *B64C 39/02*    (2006.01)
    (Continued)

(52) U.S. Cl.
    CPC ............ *G08G 1/08* (2013.01); *B64C 39/024* (2013.01); *G08G 1/081* (2013.01); *G08G 1/095* (2013.01); *G08G 1/0955* (2013.01); *G08G 5/0021* (2013.01); *G08G 5/0069* (2013.01); *G08G 5/0078* (2013.01); *G08G 5/0086* (2013.01); *B64C 2201/027* (2013.01);
    (Continued)

(58) Field of Classification Search
    CPC .......... B64C 2201/027; B64C 2201/06; B64C 2201/066; B64C 2201/127; G08G 1/083; G08G 1/0955; G08G 5/0021
    See application file for complete search history.

(56) References Cited

U.S. PATENT DOCUMENTS

| 10,055,984 B1 *  | 8/2018 | Schaeffer ............... G08G 1/167 |
| 2002/0116118 A1 * | 8/2002 | Stallard .................... G08G 1/01 |
| | | 701/117 |

(Continued)

FOREIGN PATENT DOCUMENTS

| WO | WO-2014080388 A2 * | 5/2014 | ........... B64C 39/024 |
| WO | WO-2017223531 A1 * | 12/2017 | ............. G08G 1/012 |

OTHER PUBLICATIONS

Sen et al., "Controlled Optimization of Phases at an Intersection," Transportation Science, vol. 31, No. 1, Feb. 1997, 14 pages.

(Continued)

*Primary Examiner* — Christopher D Hutchens
(74) *Attorney, Agent, or Firm* — Hanley, Flight & Zimmerman, LLC

(57) ABSTRACT

An example unmanned aerial vehicle traffic signal and related methods are disclosed. The example unmanned aerial vehicle includes a housing, a rotor, a motor, a sensor, a traffic signal, and a processor. The rotor is to lift the housing off ground. The motor is to drive the rotor. The sensor is to monitor traffic. The traffic signal is carried by the housing. The processor is to control the traffic signal based on the traffic monitored by the sensor.

19 Claims, 31 Drawing Sheets

(51) Int. Cl.
*G08G 5/00* (2006.01)
*G08G 1/0955* (2006.01)

(52) U.S. Cl.
CPC .. *B64C 2201/066* (2013.01); *B64C 2201/108* (2013.01); *B64C 2201/127* (2013.01); *B64C 2201/145* (2013.01)

(56) References Cited

U.S. PATENT DOCUMENTS

| | | | |
|---|---|---|---|
| 2014/0034776 A1* | 2/2014 | Hutson | B64D 45/00 244/17.17 |
| 2015/0336669 A1* | 11/2015 | Kantor | G01C 21/3415 701/3 |
| 2016/0137311 A1* | 5/2016 | Peverill | B64C 39/024 244/110 C |
| 2016/0221688 A1* | 8/2016 | Moore | B64F 1/00 |
| 2016/0272317 A1* | 9/2016 | Cho | G08G 1/09 |
| 2016/0347192 A1* | 12/2016 | Lee | B60L 53/30 |
| 2017/0015415 A1* | 1/2017 | Chan | B60L 53/126 |
| 2018/0061235 A1* | 3/2018 | Goldberg | B64C 39/024 |
| 2018/0075759 A1* | 3/2018 | Kim | G08G 5/0069 |
| 2018/0134387 A1* | 5/2018 | Kovac | B29C 64/106 |
| 2019/0135113 A1* | 5/2019 | Koo | B60L 53/12 |

OTHER PUBLICATIONS

Unpublished U.S. Appl. No. 15/806,134, filed Nov. 7, 2017, 83 pages.

\* cited by examiner

| TABLE 2 | | |
|---|---|---|
| Stage 1 ("O") Calculations | | |
| $s_1$ | $x^*_1(s_1)$ | $v_1(s_1)$ |
| 1 | 0 | 1 |
| 2 | 1 | 1 |
| 3 | 2 | 0 |
| 4 | 3 | 1 |
| 5 | 4 | 3 |
| 6 | 5 | 7 |
| 7 | 6 | 12 |
| 8 | 7 | 19 |
| 9 | 8 | 27 |
| 10 | 9 | 35 |

FIG. 14

TABLE 3

Delays for Stage 2 ("M") at time unit 7 ($s_2=7$) ($j=2$)

| $x_2$ | $s_{j-1}$ | $f_2(7, x_2)$ | $g_2(7, x_2)$ | $v_{j-1}(s_{j-1})$ | $v_2(7)=f_2(7, x_2) + g_2(7, x_2) + v_{j-1}(s_{j-1})$ |
|---|---|---|---|---|---|
| 0 | 7 | 0 | 0 | 12 | 12 |
| 2 | 4 | 9 | 0 | 1 | 10 |
| 3 | 3 | 10 | 8 | 0 | 18 |
| 4 | 2 | 15 | 14 | 1 | 30 |
| 5 | 1 | 22 | 5 | 1 | 28 |

FIG. 15

| TABLE 4 | | |
|---|---|---|
| Stage 2 "M" Calculations | | |
| $s_2$ | $x^*_2(s_2)$ | $v_2(s_2)$ |
| 1 | 0 | 1 |
| 2 | 0 | 1 |
| 3 | 0 | 0 |
| 4 | 0 | 1 |
| 5 | 0 | 3 |
| 6 | 0 | 7 |
| 7 | 2 | 10 |
| 8 | 2 | 14 |
| 9 | 3 | 18 |
| 10 | 4 | 23 |

FIG. 16

| TABLE 5 | | | | | | | |
|---|---|---|---|---|---|---|---|
| Value Functions for all Stages | | | | | | | |
| s | $v_1$ | $v_2$ | $v_3$ | $v_4$ | $v_5$ | $v_6$ | $v_7$ |
| 1 | 1 | 1 | 1 | 1 | 1 | 1 | |
| 2 | 1 | 1 | 1 | 1 | 1 | 1 | |
| 3 | 0 | 0 | 0 | 0 | 0 | 0 | |
| 4 | 1 | 1 | 1 | 1 | 1 | 1 | |
| 5 | 3 | 3 | 3 | 3 | 3 | 3 | |
| 6 | 7 | 7 | 2 | 2 | 2 | 2 | |
| 7 | 12 | 10 | 3 | 3 | 3 | 3 | |
| 8 | 19 | 14 | 7 | 7 | 7 | 7 | |
| 9 | 27 | 18 | 10 | 10 | 8 | 8 | |
| 10 | 35 | 23 | 12 | 11 | 9 | 8 | 8 |

UNMANNED AERIAL VEHICLE TRAFFIC SIGNALS AND RELATED METHODS

FIELD OF THE DISCLOSURE

This disclosure relates generally to traffic management, and, more particularly, to unmanned aerial vehicle traffic signals and related methods.

BACKGROUND

In recent years, ground based vehicle traffic at an intersection has been monitored and directed with a programmable traffic signal. The traffic signal is typically fixed to a utility pole at the intersection.

BRIEF DESCRIPTION OF THE DRAWINGS

FIGS. 13-18 illustrate another example intersection and example tables used to produce an example traffic coordination solution for the intersection.

Figure 1:
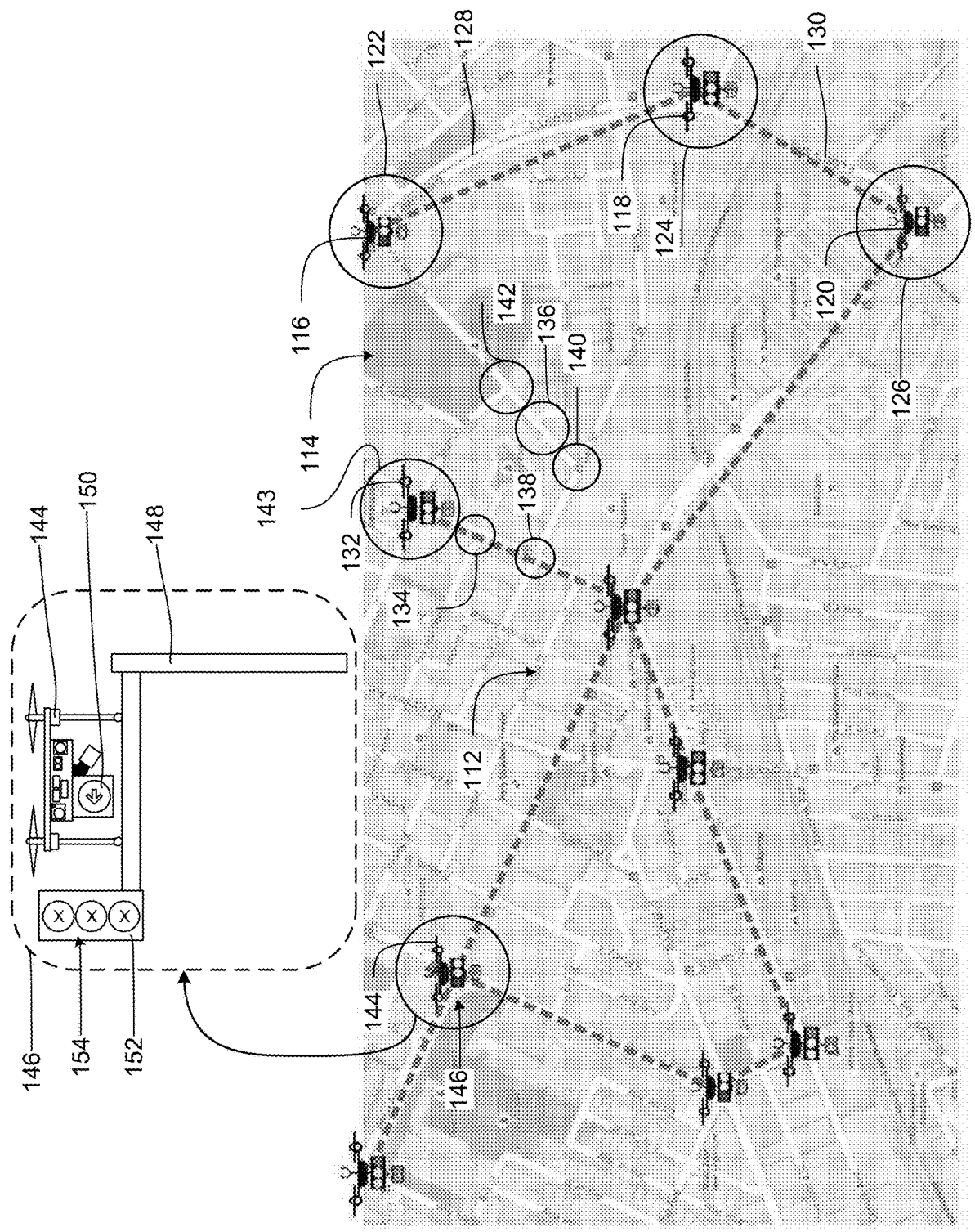
FIG. 1 illustrates an example traffic coordination network of unmanned aerial vehicles constructed in accordance with the teachings of this disclosure and deployed to coordinate traffic.

The figures are not to scale. Wherever possible, the same reference numbers will be used throughout the drawing(s) and accompanying written description to refer to the same or like parts. As used in this patent, stating that any part is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Traffic signals fixed to utility poles (e.g., traffic lights, etc.) are used to coordinate vehicle traffic at intersections. A traffic signal at an intersection displays a green light for a first time period to first vehicles to indicate that the first vehicles are to proceed through the intersection and displays a red light during the first time period to second vehicles to indicating that the second vehicles are to stop at the intersection. After the first time period elapses, the traffic signal displays a red light for a second time period to the first vehicles and a green light during the second time period to the second vehicles. Thus, the traffic signal regulates flow of the first and second vehicles streams through the intersection in a manner so as to avoid a collision. Some known systems have utilized sensors coupled to the traffic signal to measure oncoming (e.g., upstream traffic that is approaching the traffic signal) vehicle streams at the intersection to produce traffic data associated with the intersection. Some such systems include a measurement system to generate a traffic management solution for the intersection based on the traffic data. The traffic management solution describes a green light sequence and corresponding time periods for the oncoming vehicle streams. The traffic signal is then operated according to the traffic management solution. However, because known systems are fixed to utility poles, additional traffic signals cannot be quickly added to, for example, an urban area when the traffic signals fail, in response to a special traffic event (e.g., a sporting event, an accident, a concert, a storm, etc.), etc. Further, known systems do not account for vehicle interactions downstream of the specific intersection being managed when generating the traffic management solutions and do not share the traffic management solutions with other traffic signals to facilitate coordination of traffic between intersections.

Example systems, methods, and apparatus disclosed herein utilize one or more unmanned aerial vehicles (e.g., a drone, etc.) to coordinate traffic at an intersection. As used herein, the terms "unmanned aerial vehicle" and "drone" are interchangeable. The one or more unmanned aerial vehicles are deployed to the intersection. The one or more unmanned aerial vehicles collect and analyze upstream and downstream vehicle interaction data of the intersection. As used throughout the description and the accompanying claims, "a" and/or "an" are defined to refer to "one or more" of the noun they precede. Thus in the interest of readability, "one or more" will not be repeated after a noun is introduced by "a," "an," or "one or more." Instead, subsequent reference to that noun (which may be preceded by "the") are to be understood as referring to "one or more" of the noun. Thus, an unmanned aerial vehicle (UAV) introduced as "a UAV" or "one or more UAVs" will later be referred to as "the UAV" without loss of generality such that "the UAV" is intended to mean "the one or more UAVs." This convention applies to all sentences of this patent (specification, figures, claims, etc.) and to all nouns unless otherwise indicated.

In some examples, an unmanned aerial vehicle (UAV) receives traffic coordination solutions from UAVs at neighboring intersections. In some examples the UAV generates a traffic coordination solution for the first intersection based on the upstream and downstream vehicle data obtained at the first intersection and the shared traffic coordination solutions of the neighboring intersections. In some such examples, the UAV at the first intersection shares the generated traffic coordination solution with neighboring intersections. The UAV at the first intersection displays traffic signals according to the generated traffic coordination solution. Thus, in some examples, traffic at the first intersection is managed according to upstream and downstream vehicle interactions obtained at the first intersection and/or based on data from neighboring intersections. Further, in some examples, traffic coordination may be facilitated by deploying UAVs to one or more intersections with inoperative stationary traffic signal(s) in response to, for example, an outage of power or other event interfering with the operation of the stationary traffic signal, a need for traffic control at intersection(s) lacking traffic signals (e.g., in response to a special event such a sporting event, a concert, an accident, a storm, etc.) that results in special (e.g., unusually heavy) pedestrian and/or vehicle traffic, etc.

FIG. 1 illustrates an example traffic coordination network 112 of UAVs constructed in accordance with the teachings of this disclosure and deployed to coordinate traffic in a geographic area. Some or all of the UAVs of the traffic coordination network 112 of FIG. 1 are equipped with a traffic signal (e.g., a traffic light, a display, a lamp, a beacon, a signal, a flag, etc.), which may be used to direct traffic. In some examples, the UAVs of the traffic coordination network 112 travel autonomously (e.g., fly, drive, etc.) from a central facility to assigned intersections of a roadway network 114 (e.g., a street grid, an urban area, a city, a town, a traffic pattern, etc.) In some such examples, global positioning coordinates of the intersections and/or coupling point(s) at corresponding ones of the intersections are provided to the UAVs to direct the UAVs to the same. In some such examples, the UAVs navigate based on the provided global positioning coordinates from the central facility to arrive at the intersections and/or coupling point(s) at corresponding ones of the intersections. In the illustrated example of FIG. 1, a first UAV 116, a second UAV 118, and a third UAV 120 of the traffic coordination network 112 are respectively stationed at first, second, and third intersections 122, 124, 126 of a roadway network 114. Other intersections and UAVs are also present in FIG. 1.

In operation, the UAVs of this example communicate with neighboring UAVs located on a continuous stretch of roadway away, as denoted by dashed lines in the illustrated example of FIG. 1. In the illustrated example, UAVs are classified as neighbors in this example where a direct roadway path exists between the UAVs. Thus, in the illustrated example of FIG. 1, the first UAV 116 is a neighbor to the second UAV 118 because the first and second UAVs 116, 118 are directly linked by a first continuous road 128 (e.g., no turns at intervening intersections are made to travel from the first intersection 122 to the second intersection 124). In the illustrated example of FIG. 1, although depicted as curved, the first continuous road 128 directly links the first intersection 122 to the second intersection 124 because travel between the first intersection 122 and the second intersection 124 occurs only on the first continuous road 128. In the illustrated example of FIG. 1, the second UAV 118 is a neighbor to the third UAV 120 because the second and third UAVs 118, 120 are directly linked by a second continuous road 130. In the illustrated example of FIG. 1, the first UAV 116 is not a neighbor of a fourth UAV 132 because no continuous road exists between the first and fourth UAVs 116, 132. Instead, indirect paths through multiple intersections 134, 136, 138, 140, 142 exist between the first intersection 122 and a fourth intersection 143, where the first and fourth UAVs 116, 132 are respectively located.

Some or all of the UAVs of the traffic coordination network 112 of FIG. 1 are each equipped with at least one sensor (e.g., a camera, a radio detection and ranging (RADAR) system, a global positioning satellite (GPS) receiver, a hygrometer, and/or a light detection and ranging (LIDAR) system, etc.). Examples of such sensors will be described in greater detail in conjunction with FIG. 4. In operation, the UAVs of the example traffic coordination network 112 of FIG. 1 respectively sense traffic conditions at their assigned intersection (e.g., a number of cars waiting to proceed through the intersection, time of day, light quantity at the intersection, weather at the intersection, accidents at the intersection, upstream and downstream vehicle streams approaching and/or leaving the intersection, oncoming and departing vehicles of the intersection, etc.) In the example of FIG. 1, the UAVs transmit traffic analysis data about the respective assigned intersection to (at least) neighboring UAVs. In this example, the UAVs respectively generate traffic coordination solutions for their respectively assigned intersection based on traffic conditions at the assigned intersection, traffic interactions at the assigned intersection, and traffic analysis data received from one or more neighboring UAV(s). Example traffic coordination solutions are to be discussed in greater detail in conjunction with FIGS. 3 and/or 12-18. The UAVs in the example of FIG. 1 display traffic signals to their respectively assigned intersections based on the generated traffic coordination solutions. The UAVs also collect and share traffic information. For example, the second UAV 118 at the second intersection 124 collects traffic conditions at the second intersection 124 (e.g., vehicles waiting at the second intersection 124, vehicles arriving at the second intersection 124, vehicles in turn lanes, vehicles in non-turning lanes, vehicle signals (e.g., flashing lights on cars or trucks indicating an intention to turn), vehicles departing from the second intersection 124, weather at the second intersection 124, time of day at the second intersection 124, etc.), and traffic interactions between vehicles at the second intersection 124. In the illustrated example of FIG. 1, the second UAV 118 transmits the traffic data collected at the second intersection 124 to the neighboring first and third UAVs 116, 120. In the illustrated example of FIG. 1, the second UAV 118 receives traffic analysis data about the neighboring first and third intersections 122, 126 respectively from the neighboring first and third UAVs 116, 120. In the illustrated example of FIG. 1, the second UAV 118 generates a traffic coordination solution for the second intersection 124 based on the data collected at the second intersection 124 and traffic interaction analysis data about the first and third intersections 122, 126. In the illustrated example of FIG. 1, the second UAV 118 displays traffic signals to the second intersection 124 based on the traffic coordination solution generated for the second intersection 124.

In some examples, upon arrival at their respectively assigned intersection, the UAVs of the traffic coordination network 112 couple (e.g., land, perch, hang, suspend from, attach, stick, hold on to, etc.) to a fixed structure (e.g., a utility pole, a traffic pole, a light pole, a telecommunications pole, a power pole, etc.) located at the respectively assigned intersection. Preferably, the location(s) selected for coupling is visible to traffic approaching the intersection. In some examples, more than one UAV is sent to each intersection with each UAV positioned to display its traffic signal in a specific direction. For example, four UAVs may be assigned to one intersection of two intersecting streets with one of the four UAVs pointing its display toward one of the four directions from which traffic approaches. In such examples, the traffic signals displayed by the UAVs are coordinated with one another.

In some examples, coupling to a fixed structure conserves energy resources (e.g., battery charge, fuel, etc.) of the UAV as rotors, motors, etc. of the UAV may be de-energized when the UAV is not flying. In some examples, coupling of the UAV to the fixed structure approximates a customary location of a permanently installed (e.g., stationary) traffic signal (e.g., the UAV couples near where motorists expect to see the permanently installed traffic signal). In some such examples, the UAV may replace an inoperative permanently installed (e.g., stationary) traffic signal. In the illustrated example of FIG. 1, a fifth UAV 144 is assigned to a fifth intersection 146. As shown in the enlargement of the fifth intersection 146, the fifth UAV 144 is perched on top of a utility pole 148 at the fifth intersection 146. A traffic signal 150 of the fifth UAV 144 is to replace a traffic signal 152 of the utility pole 148, which is inoperative, as denoted by "X" in the lamps 154 of the traffic signal 152 of the utility pole 148. In the illustrated example of FIG. 1, the fifth UAV 144 is perched on the utility pole 148 near the inoperative traffic signal 152 of the utility pole 148 to aid motorists accustomed to being directed through the fifth intersection 146 by the traffic signal 152 of the utility pole 148 while the traffic signal 152 of the utility pole 148 is operative.

Figure 2:
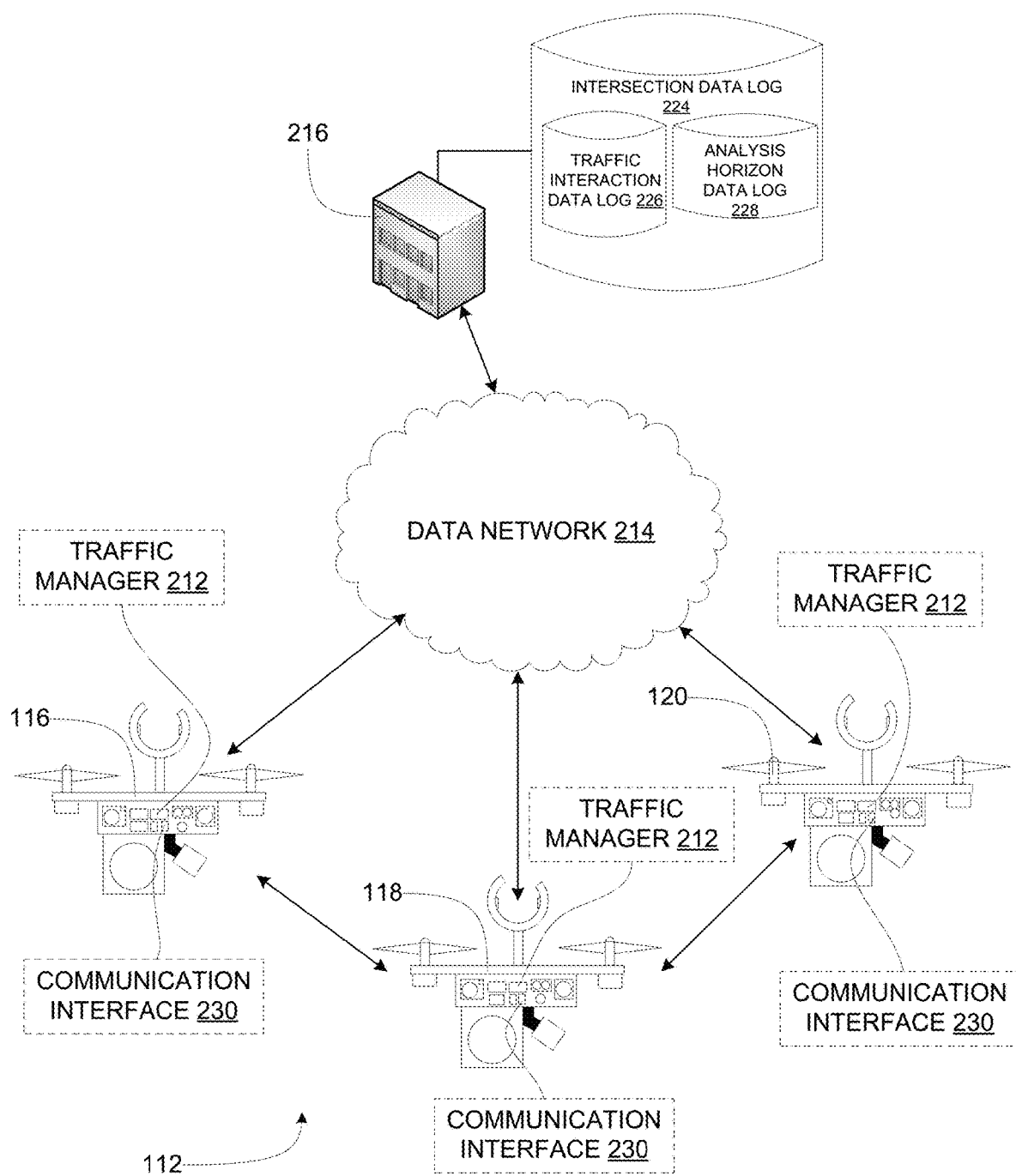
FIG. 2 illustrates the example traffic coordination network of unmanned aerial vehicles of FIG. 1 in connection with a data network and a central facility.

FIG. 2 illustrates the example traffic coordination network 112 of FIG. 1 in connection with a data network 214 and a central facility 216. The illustration of FIG. 2 includes a subset of the UAVs of FIG. 1 (e.g., first, second, and third UAVs 116, 118, 120) although, as noted above, any number of UAVs may compose the traffic coordination network 112 and, thus, additional UAVs may be present. In some examples, the UAVs of the traffic coordination network 112 each include a traffic manager 212, which is structured to collect real time traffic data, develop a traffic coordination solution based on the collected data, control the traffic signal of the UAV (and/or other UAVs) to direct traffic based on the traffic coordination solution.

The central facility 216 of the illustrated example of FIG. 2 synchronizes data for multiple UAVs, coordinates deployment of the UAVs, logs UAV behavior, traffic data, and/or intersection data and can coordinate global traffic patterns across an area of interest by connecting with UAVs at various intersections. In some examples, the central facility 216 includes an intersection data log 224. In some examples, the intersection data log 224 includes a traffic interaction data log 226 and an analysis horizon data log 228. In some examples, the UAVs of the traffic coordination network 112 each include a communication interface 230 (e.g., a transmitter, a receiver, a transceiver, a data bus, an output device driver, etc.) structured to communicate with the central facility 216 via the data network 214 and/or with other UAVs via direct wireless connection (e.g., a point-to-point wireless connection, point to point WiFi, radio transmission, microwave transmission, etc.) and/or via the data network 214. While the illustrated example of FIG. 2 depicts the central facility 216 as being in communication with the first, second, and third UAVs 116, 118, 120 of the traffic coordination network 112, the central facility 216 may be in communication with any number of UAVs. In the illustrated example of FIG. 2, the first, second, and third UAVs 116, 118, 120 are in communication with one another via direct wireless connection and via the data network 214. These or other UAVs may additionally or alternatively be in communication with other UAVs (e.g., neighboring UAVs) via direct wireless connection and/or the data network 214.

The UAVs of the traffic coordination network 112 receive instructions (e.g., global positioning coordinates of assigned intersections, deployment commands, return commands, etc.) from the central facility 216 via the communication interface 230 and the data network 214 or a wired connection at the central facility 216. In operation, UAVs of the traffic coordination network 112 transmit location reports to neighboring UAVs and/or the central facility 216 via the communication interface 230, the data network 214, and/or direct wireless connection.

In operation, the traffic managers 212 of the UAVs of the traffic coordination network 112 obtain intersection data (e.g., intersection assignments, global positioning coordinates of the assigned intersections, fixed structure locations at the assigned intersections, weather reports, etc.) from the intersection data log 224 via the communication interface 230, the central facility 216, and/or the data network 214. The traffic managers 212 may additionally or alternatively retrieve traffic interaction data for their assigned intersections (e.g., an intersection type, a number of turn lanes of the intersection, a number straight lanes of the intersection, topography of the intersection, non-conflicting traffic interactions possible at the intersection, a default traffic signal sequence for the intersection, etc.) from the traffic interaction data log 226 via the communication interface 230, the central facility 216, and/or the data network 214. Additionally or alternatively, the traffic managers 212 may retrieve analysis horizon data (e.g., a default analysis horizon for the intersection, a maximum traffic coordination solution time period, etc.) from the analysis horizon data log 228 via the communication interface 230, the central facility 216, and/or the data network 214. Some or all of the traffic managers 212 iteratively generate traffic coordination solutions for the assigned intersections based on the intersection data, the traffic interaction data, the analysis horizon data, traffic conditions identified at the assigned intersection (e.g., a number of cars waiting to proceed through the intersection, time of day, light quantity at the intersection, weather at the intersection, accidents at the intersection, etc.) and/or traffic data and/or coordination solutions received from neighboring UAVs. Each traffic manager 212 generates traffic analysis data and a traffic coordination solution for its assigned intersection. In operation, each UAV of the traffic coordination network 112 shares its generated traffic analysis data and traffic coordination solutions with neighboring UAVs via the communication interface 230, the data network 214, and/or direct wireless connection.

Figure 3:
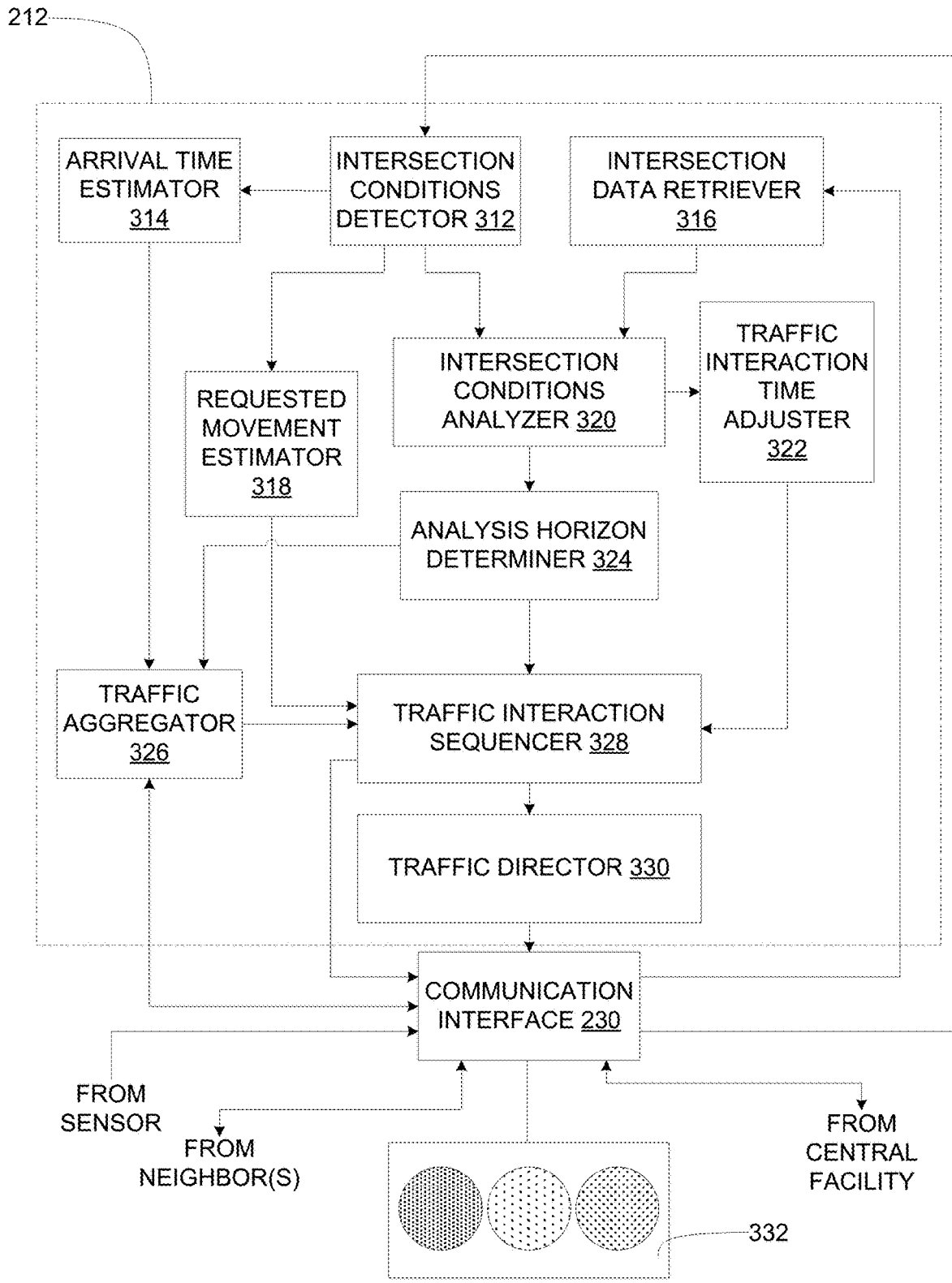
FIG. 3 illustrates an example implementation of the example traffic manager of FIG. 2.

FIG. 3 illustrates an example implementation of the example traffic manager of FIG. 2. The example traffic manager 212 includes an intersection conditions detector 312, an arrival time estimator 314, an intersection data retriever 316, a requested movement estimator 318, an intersection conditions analyzer 320, a traffic interaction time adjuster 322, an analysis horizon determiner 324, a traffic aggregator 326, a traffic interaction sequencer 328, and a traffic director 330.

The example intersection conditions detector 312 is in communication with the at least one sensor of a UAV (e.g., the second UAV 118) of the traffic coordination network 112 of FIGS. 1 and 2 via the communication interface 230. The example intersection conditions detector 312 detects a location of the UAV. The example intersection conditions 312 detector detects traffic conditions at the intersection to which the UAV is assigned (e.g., the second intersection 124 of FIG. 1). For example, the intersection conditions detector 312 detects a number of vehicles in intersection traffic queues of the intersection, blocked and/or unavailable lanes of the intersection (e.g., lanes impeded by an accident, construction, debris, roadway damage, etc.), a light quantity at the intersection, an air humidity quantity at the intersection (e.g., rain, snow, precipitation, etc.), vehicles approaching the intersection, requested vehicle movement indicators of approaching vehicles (e.g., a turn signal) distances of approaching vehicles (e.g., upstream vehicles) to the intersection, distances of departing vehicles (e.g., downstream vehicles) from the intersection, roadway lanes of the approaching vehicles, signals from the approaching vehicles, velocities of the approaching vehicles, etc.

The example arrival time estimator 314 is in communication with the intersection conditions detector 312. In operation, the arrival time estimator 314 estimates an arrival time of vehicles approaching the specific intersection to which the UAV is assigned based on distances and velocities of vehicles approaching the specific intersection provided by the intersection conditions detector 312. Estimation of vehicle arrival times is to be discussed in greater detail in conjunction with FIG. 8.

The example requested movement estimator 318 is in communication with the intersection conditions detector 312. In operation, the requested movement estimator estimates requested vehicle movements (e.g., traffic interactions) of vehicles approaching the specific intersection to which the UAV is assigned based on the requested vehicle movement indicators (e.g., the roadway lanes of, messages from, and/or signals from the approaching vehicles) provided by the intersection conditions detector 312. Estimation of requested vehicle movements is to be discussed in greater detail in conjunction with FIG. 9.

The example intersection data retriever 316 is in communication with the example communication interface 230. The example intersection data retriever 316 retrieves intersection data (e.g., intersection geometry, intersection topography, default non-conflicting traffic interactions, a default traffic interaction sequence, a default analysis horizon, weather reports, etc.) from the example central facility 216 of FIG. 2 via the example communication interface 230. Intersection data is to be discussed in greater detail in conjunction with FIGS. 8 and 10-12.

The example intersection conditions analyzer 320 is in communication with the example intersection conditions detector 312 and with the intersection data retriever 316. The example intersection conditions analyzer 320 updates (e.g., adjusts, modifies, changes, alters, etc.) a default ordered set of non-conflicting traffic interactions received from the intersection data retriever 316 based on traffic conditions at the specific intersection to which the UAV is assigned provided by the intersection conditions detector 312. The example intersection conditions analyzer disables (e.g., assigns a green light duration of zero) non-conflicting traffic interactions based on blocked and/or unavailable lanes of the intersection (e.g., lanes impeded by an accident, construction, debris, roadway damage, etc.). The example intersection conditions analyzer 320 determines an ordered set of available non-conflicting traffic interactions for the specific intersection. Non-conflicting traffic interactions are to be discussed in greater detail in conjunction with FIGS. 10-18.

The example analysis horizon determiner 324 is in communication with the example intersection conditions analyzer 320. The example analysis horizon determiner 324 receives a default analysis horizon of the specific intersection to which the UAV is assigned from the example central facility 216 of FIG. 2 via the intersection conditions analyzer 320, the intersection data retriever 316, and the communication interface 230. The example analysis horizon determiner 324 adjusts (e.g., updates, modifies, changes, alters, etc.) the default analysis horizon based on traffic conditions (e.g., a number of vehicles in the intersection traffic queues of the intersection, a light quantity at the intersection, an air humidity quantity at the intersection, etc.) provided by the intersection conditions analyzer 320. In operation, the example analysis horizon determiner 324 adds time to the analysis horizon for hazardous traffic conditions (e.g., wet weather, high traffic volume, night, fog, low visibility, etc.). Additionally or alternatively, the example analysis horizon determiner 324 maintains the default analysis horizon based on the traffic conditions. Analysis horizons are to be discussed in greater detail in conjunction with FIGS. 12-18.

The example traffic interaction time adjuster 322 of FIG. 3 is in communication with the example intersection conditions analyzer 320. The example traffic interaction time adjuster 322 receives traffic conditions and the determined ordered set of available non-conflicting traffic interactions for the specific intersection to which the UAV is assigned from the intersection conditions analyzer 320. The example traffic interaction time adjuster 322 determines a downstream lane saturation based on the traffic conditions (e.g., distances of departing vehicles downstream from the intersection). The example traffic interaction time adjuster 322 determines a downstream vehicle traffic queue length based on the traffic conditions and the intersection data. The example traffic interaction time adjuster 322 adjusts (e.g., updates, modifies, changes, alters, etc.) default time extremes (e.g., maximum and minimum green light durations) of the available non-conflicting traffic interactions based on the downstream lane saturation. As the downstream lane saturation increases, the traffic interaction time adjuster 322 decreases the times (e.g., green light durations) of the available non-conflicting traffic interactions feeding saturated downstream lanes. In some such examples, traffic volume in lanes downstream of the specific intersection is thus allowed to clear (e.g., downstream traffic does not spill over into the intersection). Downstream lane saturation is to be discussed in further detail in conjunction with FIG. 8.

The example traffic aggregator 326 is in communication with the arrival time estimator 314, with the analysis horizon determiner 324, and with the communication interface 230. The example traffic aggregator 326 receives the determined analysis horizon for the specific intersection to which the UAV is assigned from the analysis horizon determiner 324. The example traffic aggregator 326 receives estimated arrival times for vehicles approaching the specific intersection from the arrival time estimator 314. The example traffic aggregator 326 receives additional estimated arrival times for vehicles approaching the specific intersection from neighboring UAVs respectively assigned to neighboring intersections via the communication interface 230. The example traffic aggregator 326 ignores (e.g., does not count, discards, etc.) vehicles having estimated arrival times that are past the end of the determined analysis horizon (e.g., the vehicles approaching the intersection are due to arrive at the intersection after the determined analysis horizon has already expired). The example traffic aggregator 326 counts (e.g., retains, keeps, accounts, makes note of, etc.) vehicles having estimated arrival times within the determined analysis horizon (e.g., vehicles due to arrive at the intersection before or at the end of the determined analysis horizon). The example traffic aggregator 326 combines the number of vehicles having estimated arrival times to the intersection within the determined analysis horizon (e.g., retained approaching vehicles, counted approaching vehicles, etc.) with the number of vehicles in intersection traffic queues (e.g., stopped vehicles waiting to proceed through the intersection) to generate a traffic aggregate for the intersection. The example traffic aggregator 326 transmits the traffic aggregate to neighboring UAVs via the communication interface 230. Traffic aggregation is to be described in greater detail in conjunction with FIG. 8.

The example traffic interaction sequencer 328 is in communication with the example traffic aggregator 326, with the example analysis horizon determiner 324, with the example requested movement estimator 318, and with the example traffic interaction time adjuster 322. The example traffic interaction sequencer 328 receives the traffic aggregate from the traffic aggregator 326. The example traffic interaction sequencer 328 receives estimated vehicle movement requests from the requested movement estimator 318 and receives the determined analysis horizon from the analysis horizon determiner 324, and the ordered set of time-adjusted available traffic interactions from the traffic interaction time adjuster 322. The example traffic interaction sequencer 328 generates a traffic coordination solution for the specific intersection to which the UAV is assigned based on the traffic aggregate, the determined analysis horizon, the estimated vehicle movement requests, the downstream vehicle queue length, and the time-adjusted available non-conflicting traffic interactions. The traffic coordination solution is a sequence of vehicle-releasing time durations assigned to the available non-conflicting traffic interactions of the intersection (e.g., a lineup of green light durations for the available safe vehicle movements of the intersection). The traffic coordination solution generated by the example traffic interaction sequencer 328 thus accounts for traffic volume upstream and downstream of the intersection. The traffic interaction sequencer 328 transmits the traffic coordination solution for the intersection to neighboring UAVs via the communication interface 230. Generation of the traffic coordination solution is to be described in greater detail in conjunction with FIGS. 12-18.

The example traffic director 330 is in communication with the traffic interaction sequencer 328. The example traffic director 330 receives the traffic coordination solution from the example traffic interaction sequencer 328. The traffic director 330 directs a traffic signal 332 (e.g., to which lanes of the intersection to display a green light and for how long) of the UAV in accordance with the traffic coordination solution. Traffic signals are to be described in greater detail in conjunction with FIGS. 4-7.

While an example manner of implementing the traffic manager 212 of FIGS. 2-3 is illustrated in FIG. 3, one or more of the elements, processes and/or devices illustrated in FIG. 3 may be combined, divided, re-arranged, omitted, eliminated and/or implemented in any other way. Further, the example intersection conditions detector 312, the example arrival time estimator 314, the example intersection data retriever 316, the example requested movement estimator 318, the example intersection conditions analyzer 320, the example traffic interaction time adjuster 322, the example analysis horizon determiner 324, the example traffic aggregator 326, the example traffic interaction sequencer 328, the example traffic director 330 and/or, more generally, the example traffic manager 212 of FIGS. 2-3 may be implemented by hardware, software, firmware and/or any combination of hardware, software and/or firmware. Thus, for example, any of the example the example intersection conditions detector 312, the example arrival time estimator 314, the example intersection data retriever 316, the example requested movement estimator 318, the example intersection conditions analyzer 320, the example traffic interaction time adjuster 322, the example analysis horizon determiner 324, the example traffic aggregator 326, the example traffic interaction sequencer 328, the example traffic director 330 and/or, more generally, the example traffic manager 212 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, the example intersection conditions detector 312, the example arrival time estimator 314, the example intersection data retriever 316, the example requested movement estimator 318, the example intersection conditions analyzer 320, the example traffic interaction time adjuster 322, the example analysis horizon determiner 324, the example traffic aggregator 326, the example traffic interaction sequencer 328, and/or the example traffic director 330 is/are hereby expressly defined to include a tangible computer readable storage device or storage disk such as a memory, a digital versatile disk (DVD), a compact disk (CD), a Blu-ray disk, etc. storing the software and/or firmware. Further still, the example traffic manager 212 of FIG. 3 may include one or more elements, processes and/or devices in addition to, or instead of, those illustrated in FIG. 3, and/or may include more than one of any or all of the illustrated elements, processes and devices.

Flowcharts representative of example machine readable instructions for implementing the traffic manager 212 of FIGS. 2 and/or 3 are shown in FIGS. 2-3. In this example, the machine readable instructions comprise a program for execution by a processor such as the processor 3112 shown in the example processor platform 3100 discussed below in connection with FIG. 31. The program may be embodied in software stored on a tangible computer readable storage medium such as a CD-ROM, a floppy disk, a hard drive, a digital versatile disk (DVD), a Blu-ray disk, or a memory associated with the processor 3112, but the entire program and/or parts thereof could alternatively be executed by a device other than the processor 3112 and/or embodied in firmware or dedicated hardware. Further, although the example program is described with reference to the flowcharts illustrated in FIGS. 19-30, many other methods of implementing the example traffic manager 212 may alternatively be used. For example, the order of execution of the blocks may be changed, and/or some of the blocks described may be changed, eliminated, or combined.

As mentioned above, the example processes of FIG. 3 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIG. 3 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 4:
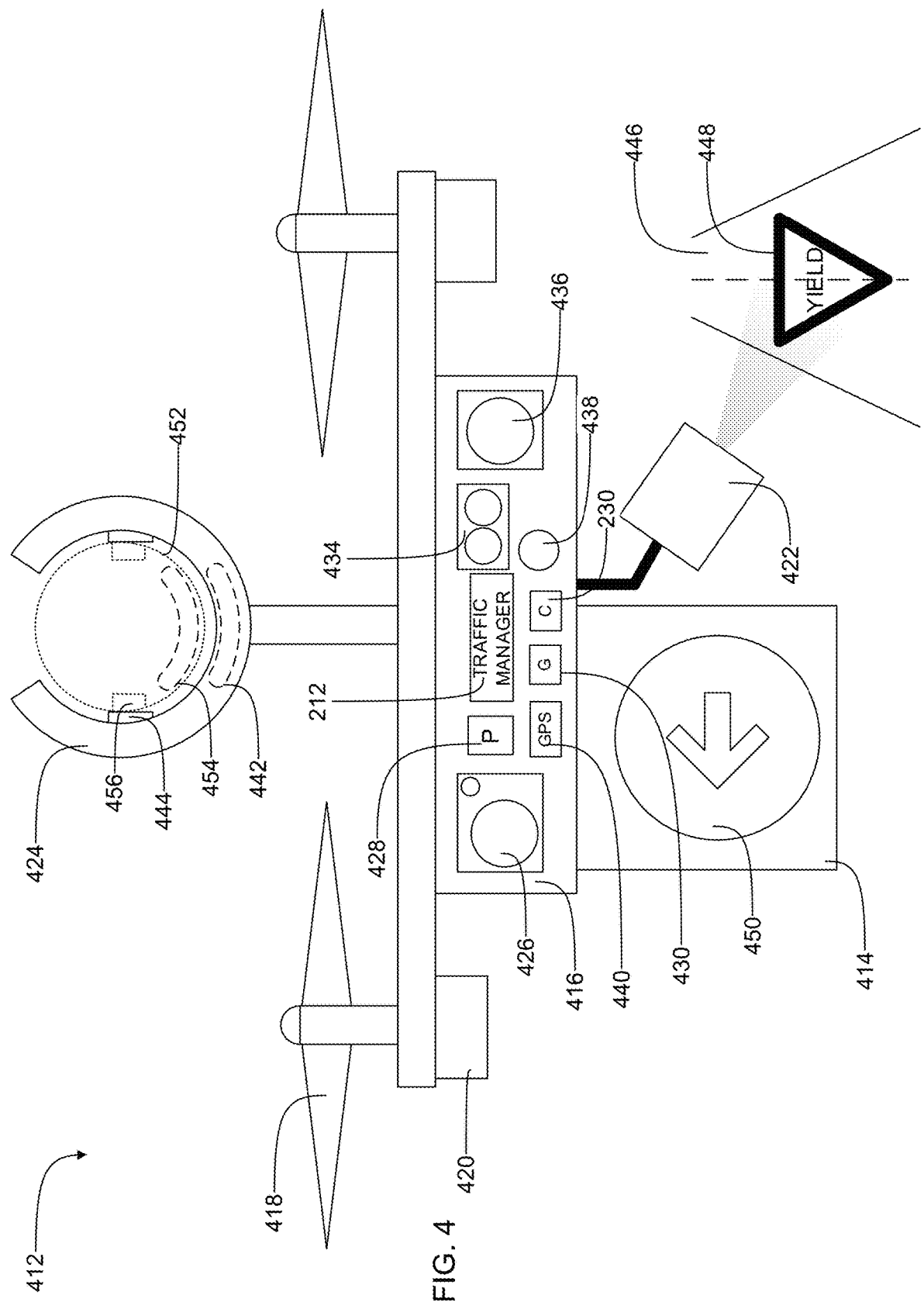
FIG. 4 illustrates an example implementation of an unmanned aerial vehicle of the traffic coordination network of FIG. 1.

FIG. 4 illustrates an example UAV 412 that may be utilized in the example traffic coordination network 112 of FIG. 1. For example, one or more of the example first UAV 116, the second UAV 118, the third UAV 120, the fourth UAV 132, the fifth UAV 144 may be implemented by the example UAV 412 of FIG. 4 implemented with an example traffic signal 414. The example UAV 412 further includes an example housing 416, an example rotor 418, and an example motor 420. The example UAV 412 also includes an example projector 422, and an example coupler 424. The motor 420, the projector 422, the coupler 424, and the traffic signal 414 are coupled to the housing 416. The rotor 418 is coupled to the motor 420. The housing 416 includes an energy resource storage device (e.g., a battery, a fuel tank, etc.) (not shown in FIG. 4.), an example camera 426, an example processor 428, an example graphics processing unit 430, the example communication interface 230, the example traffic manager 212, an example LIDAR sensor 434, an example RADAR sensor 436, an example hygrometer 438, and/or an example global positioning satellite receiver 440. The coupler 424 includes an example inductive coupling 442 and/or an example conductive coupling 444.

The example motor 420 is powered by an energy resource (e.g., electricity, fuel, etc.) stored in the energy resource storage device to drive (e.g., rotate, turn, spin, etc.) the rotor 418 to lift the UAV 412 off a surface (e.g., ground, a floor, etc.). Energy delivered to the example motor 420 may be modulated to drive the rotor 418 at different rates to navigate the UAV 412. While the example motor 420 uses the rotor 418 to generate lift, any type of propulsion may be used (e.g., a jet engine, a rocket, etc.).

The traffic manager 212 included in the example UAV 412 is in communication with a global positioning satellite (not shown in FIG. 4) via the global positioning satellite receiver 440. The traffic manager 212 receives global positioning coordinates of an assigned intersection of the roadway network 114 of FIG. 1 from the central facility 216 of FIG. 2 via the communication interface 230. The traffic manager 212 communicates with the global positioning satellite to navigate (e.g., autonomously fly) the example UAV 412 to the assigned intersection based on the global positioning coordinates.

The example camera 426, the example LIDAR sensor 434, the example RADAR sensor 436, and/or the example hygrometer 438 sense traffic and/or intersection conditions at the assigned intersection. The example graphics processing unit 430 analyzes the sensed traffic conditions at the assigned intersection to determine upstream and/or downstream traffic flows of the assigned intersection. The traffic manager 212 determines a traffic coordination solution for the assigned intersection based on the traffic conditions, the upstream and downstream traffic flows, and traffic analysis data received from neighboring UAVs via the communication interface 230. Determination of the traffic coordination solution is to be described in greater detail in conjunction with FIGS. 12-18.

In some examples, the example projector 422 projects visual information 448 (e.g., a traffic information message, a visual roadway display, a symbol, a picture, text, etc.) on a roadway 446 of the roadway network 114 of FIG. 1.

The traffic signal 414 includes a lamp 450 (e.g., an incandescent bulb, a light emitting diode, a fluorescent bulb, etc.). In operation, in some examples, the lamp 450 displays colored (e.g., red, green, amber, yellow, purple, etc.) traffic-directing lights and/or traffic-directing symbols (e.g., arrows, "X," etc.)

In the illustrated example of FIG. 4, the example UAV 412 hangs from an example utility pole 452 (shown in cross section) at the assigned intersection via the example coupler 424. Additionally or alternatively, the example UAV 412 may hang from any stationary structure (e.g., a light pole, a traffic signal pole, a telecommunications pole, a power pole, a tree branch, etc.) that is geometrically compatible with the coupler 424. The utility pole 452 includes an inductive coupling 454 and/or a conductive coupling 456 that respectively correspond to the inductive coupling 442 and the conductive coupling 444. In operation, energy transfers from the inductive coupling 454 of the utility pole 452 to the inductive coupling 442 of the UAV 412 to replenish (e.g., charge) the energy resource storage device of the UAV 412. Additionally or alternatively, in operation, energy transfers from the conductive coupling 456 of the utility pole 452 to the conductive coupling 444 of the UAV 412 to replenish the energy resource storage device of the UAV 412.

Figure 5:
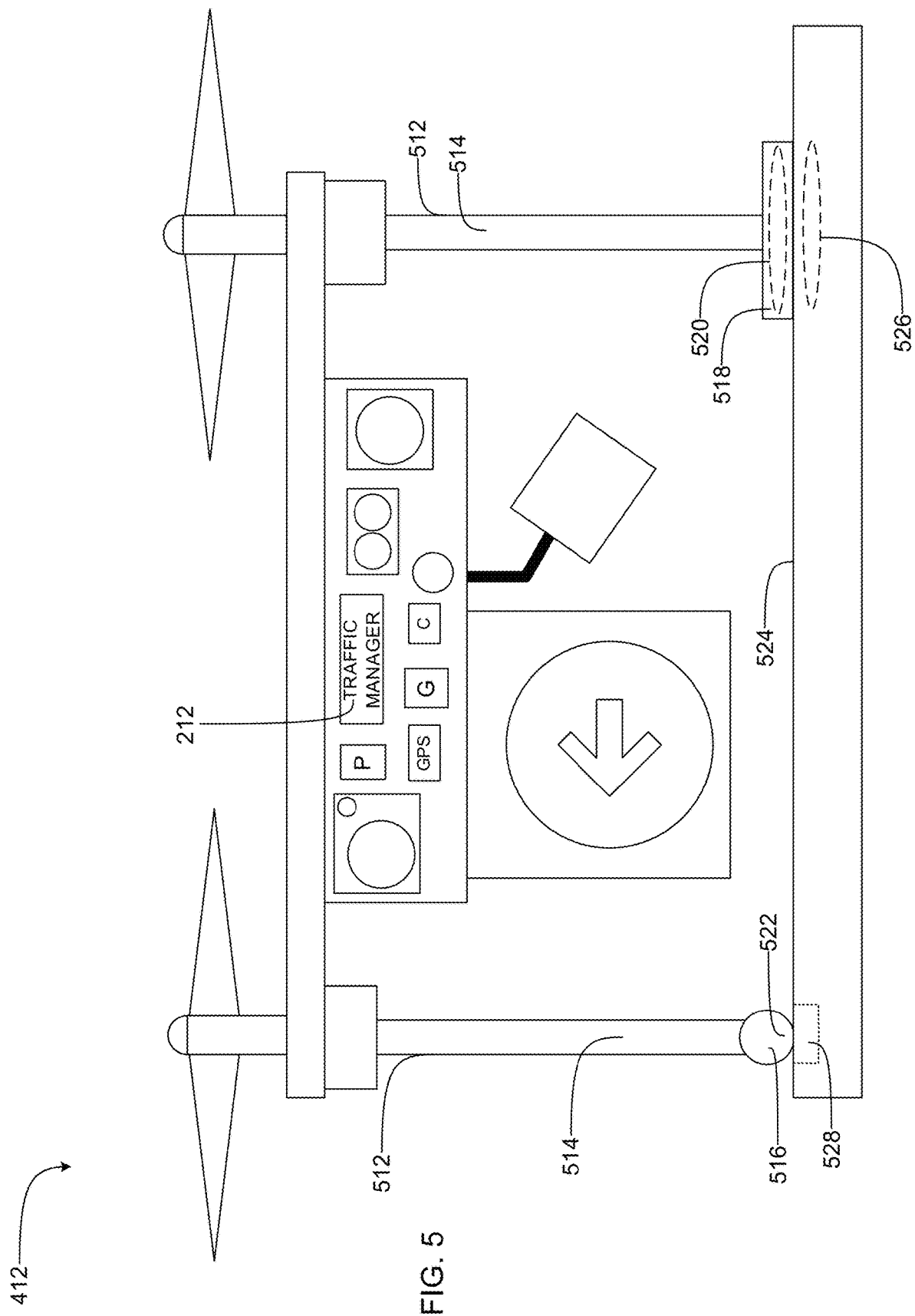
FIG. 5 illustrates an example unmanned aerial vehicle of FIG. 4 with landing gear deployed.

FIG. 5 illustrates the example UAV 412 of FIG. 4 with landing gear 512 deployed. The example landing gear 512 includes example legs 514. The example legs 514 include a touchdown point 516, a foot 518, an inductive coupling 520 and a conductive coupling 522. In the illustrated example of FIG. 5, the conductive coupling 522 is included within the touchdown point 516. In the illustrated example of FIG. 5, the inductive coupling 520 is included within the foot 518. Additionally or alternatively, the touchdown point 516 may include an inductive coupling and/or the foot 518 may operate as the conductive coupling 522. In the illustrated example of FIG. 5, the example UAV 412 is perched on (e.g., alights, lands, sits, etc.) a surface 524 at the assigned intersection. The surface 524 may be a part of any stationary structure at the assigned intersection (e.g., a utility pole, a power pole, a traffic signal pole, a light pole, a telecommunications pole, a building, a statue, etc.). In some examples, the surface 524 includes an inductive coupling 526 and/or a conductive coupling 528. In operation, energy transfers from the inductive coupling 526 of the surface 524 to the inductive coupling 520 of the UAV 412. Additionally or alternatively, in operation, energy transfers from the conductive coupling 528 of the surface 524 to the conductive coupling 522 of the UAV 412.

Figure 6:
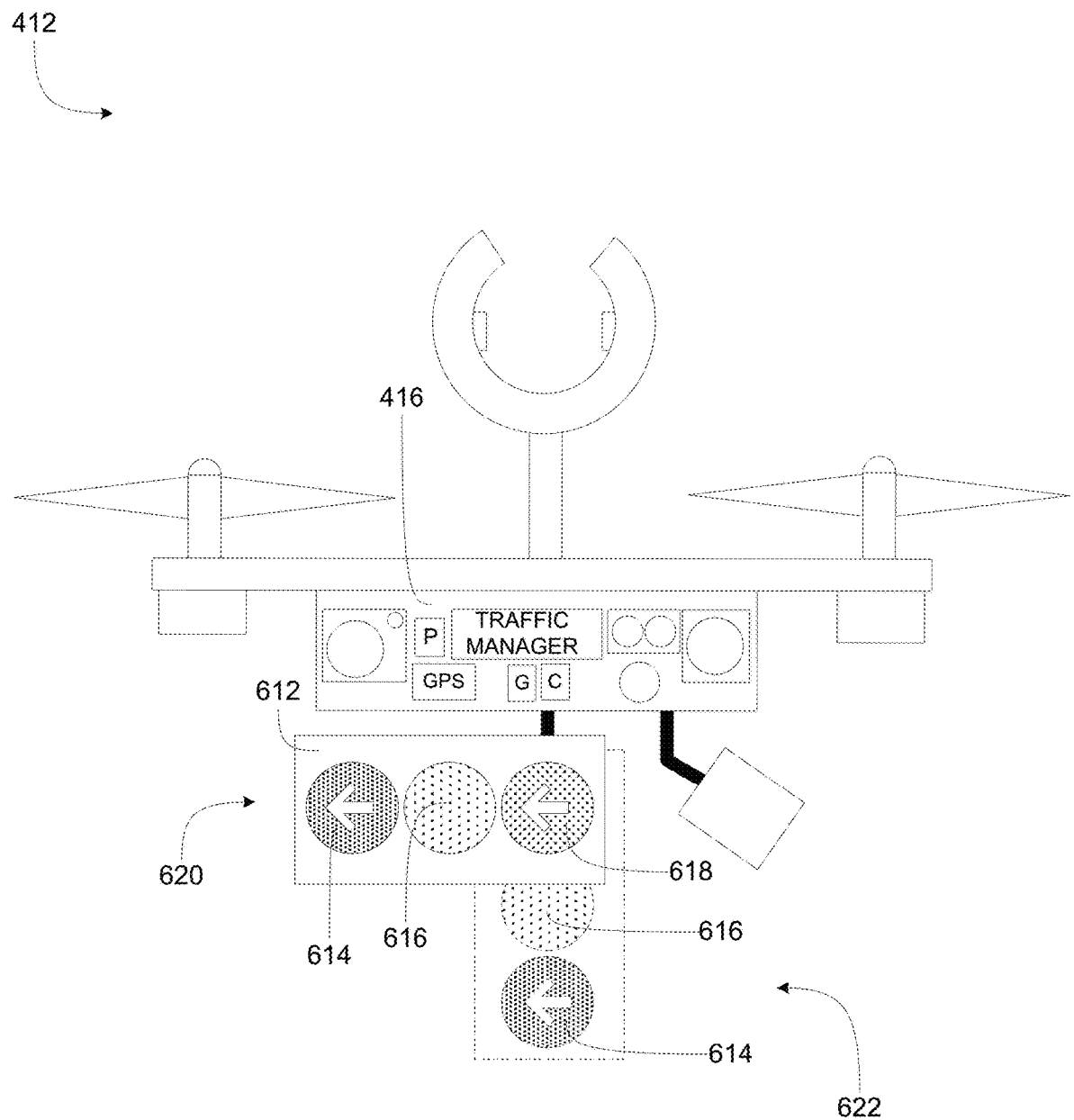
FIG. 6 illustrates another example implementation of the unmanned aerial vehicle of the traffic coordination network of FIG. 1 implemented with an alternative example traffic signal.

FIG. 6 illustrates another example implementation of the UAV 412 of the traffic coordination network of FIG. 1 implemented with an alternative example traffic signal 612. The traffic signal 612 includes a first lamp 614, a second lamp 616, and a third lamp 618 (e.g., incandescent bulbs, light emitting diodes, fluorescent bulbs, etc.). The traffic signal 612 is stowably coupled to the housing 416. In operation, the traffic signal 612 is transitioned from a stowed position 620 to a deployed position 622. In the illustrated example of FIG. 6, the deployed position 622 is shown in phantom. In some examples, the first, second, and third lamps 614, 616, 618 are colored (e.g., red, amber, green, etc.) and arranged in a customary traffic signal pattern (e.g., red uppermost, green lowermost, amber between red and green). In some examples, the first, second, and third lamps 614, 616, 618 display arrows and/or other traffic direction symbols (e.g., "X," a "walk" symbol, a "don't walk" symbol, etc.). The example UAV 412 flies to an assigned intersection with the traffic signal 612 in the stowed position 620 and deploys the traffic signal 612 to the deployed position 622 upon arrival at the assigned intersection. To return to the central facility 216 of FIG. 2, the example UAV 412 retracts the traffic signal 612 to the stowed position 620.

Figure 7:
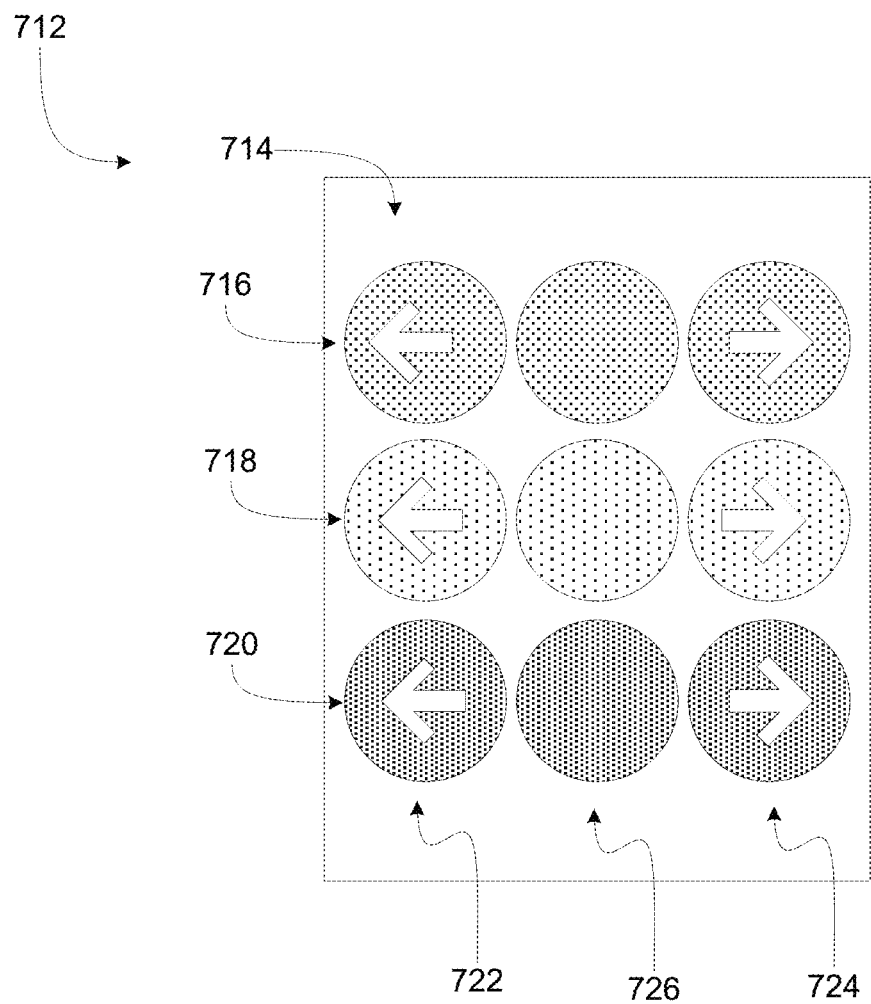
FIG. 7 is a front view of an additional alternative example traffic signal, which may be employed with any or all of the unmanned aerial vehicles of FIG. 1.

FIG. 7 is a front view of an additional alternative example traffic signal, which may be employed with any or all of the UAV of FIG. 1. The traffic signal 712 includes a plurality of lamps 714 that are colored (e.g., red, amber, green, etc.) and arranged in first, second, and third rows 716, 718, 720 in a customary traffic signal pattern (e.g., red uppermost, green lowermost, amber between red and green). In some examples, the lamps of the plurality of lamps 714 display traffic symbols (e.g., arrows, "X," a "walk" symbol, a "don't walk" symbol, etc.). In operation, traffic manager 212 of FIGS. 2-3 selectively lights the lamps of the plurality of lamps 714 to direct traffic at a multi-lane intersection. For example, lamps of a first column 722 of the traffic signal 712 may direct a left turn lane of a multi-lane intersection. For example, lamps of a second column 724 of the traffic signal 712 may direct a right turn lane of the multi-lane intersection. For example, lamps of a third column 726 of the traffic signal 712 may direct a through lane of the multi-lane intersection.

Figure 8:
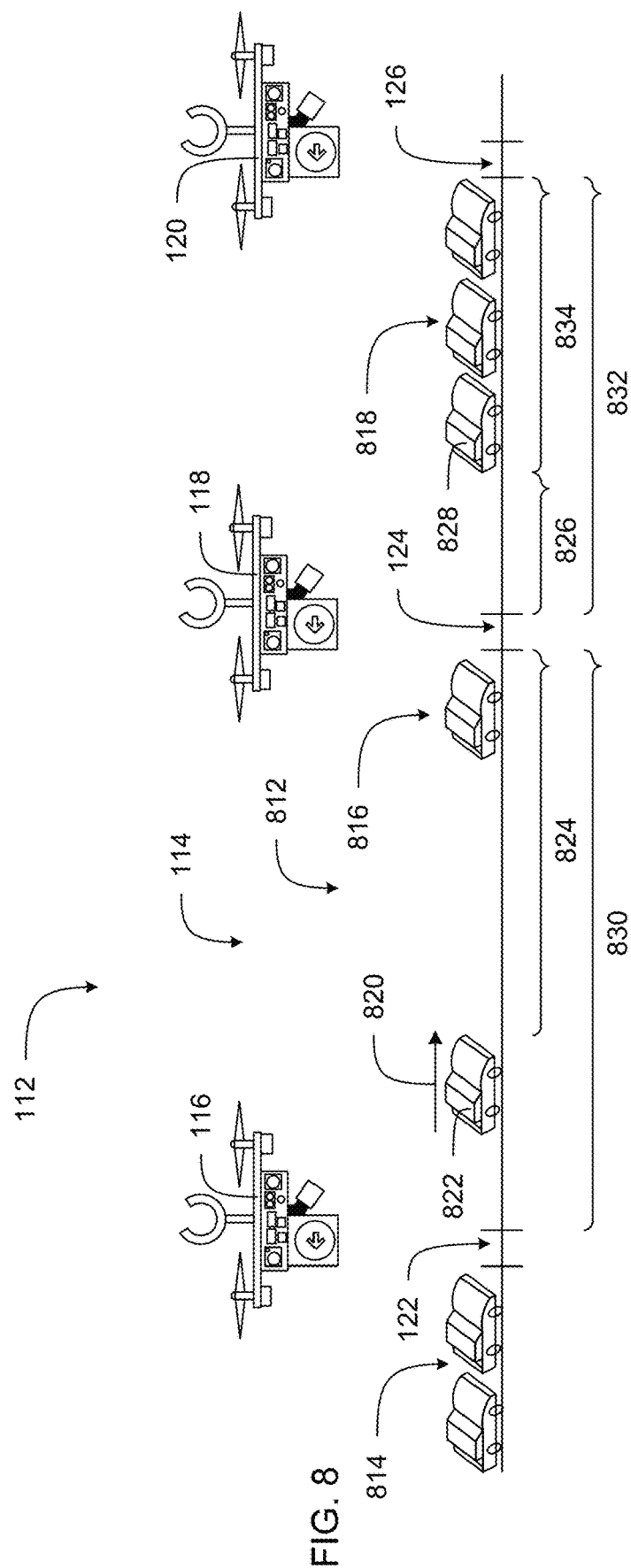
FIG. 8 illustrates an example traffic flow pattern managed by the example traffic coordination network of unmanned aerial vehicles of FIG. 1.

FIG. 8 illustrates an example traffic flow pattern 812 managed by the example traffic coordination network 112 of unmanned aerial vehicles of FIG. 1. In the illustrated example of FIG. 8, the traffic flow pattern 812 occurs between the first, second and third intersections 122, 124, 126 of the roadway network 114 of FIG. 1. As described above, the first, second, and third UAVs 116, 118, 120 are respectively assigned to the first, second, and third intersections 122, 124, 126.

The example first, second, and third UAVs 116, 118, 120 respectively count a number of vehicles waiting in first, second, and third intersection traffic queues 814, 816, 818 of the first, second, and third intersections 122, 124, 126. For example, the first UAV 116 counts two vehicles waiting in the example first intersection traffic queue 814 and the second UAV 118 counts one vehicle waiting in the second intersection traffic queue 816.

According to the illustrated example, the second UAV 118 detects a velocity 820, denoted by an arrow, of an oncoming (e.g., upstream) vehicle 822 at a first distance 824 away from the second intersection 124. The second UAV 118 estimates an arrival time at the second intersection 124 for the oncoming vehicle 822 based on the velocity 820 and the first distance 824.

The example second UAV 118 measures a second distance 826 to a closest downstream vehicle 828 of the second intersection 124. The second UAV 118 determines a downstream saturation level (e.g., how many more vehicles will fit in lanes downstream of the assigned intersection) for the second intersection 124 based on the second distance 826 and an average vehicle length.

The first UAV 116 of the illustrated example, which neighbors the second UAV 118, determines estimated arrival times for the vehicles in the first intersection traffic queue 814 based on a third distance 830 between the first and second intersections 122, 124 and a customary velocity of vehicles between the first and second intersections 122, 124 (e.g., a speed limit, a statistically predetermined average velocity, etc.). The second UAV 118 receives the vehicle count and estimated arrival times of the vehicles stopped in the first intersection traffic queue 814 from the first UAV 116.

The example second UAV 118 determines expected downstream delays at the third intersection 126 for vehicles to be released from the second intersection 124 based on a fourth distance 832 between the second intersection 124 and the third intersection 126, a queue length 834 of vehicles stopped at the downstream intersection (e.g., the difference between the fourth distance 832 and the second distance 826), a customary velocity of vehicles between the second intersection 124 and the third intersection 126, and the downstream saturation level.

The example second UAV 118 generates a traffic coordination solution based on the vehicle count of the second intersection traffic queue 816, the estimated arrival time of the oncoming vehicle 822, the downstream saturation level for the second intersection 124, the vehicle count of the first intersection traffic queue 814, the estimated arrival times of vehicles waiting in the first intersection traffic queue 814, and the expected downstream delays at the third intersection 126.

Figure 9:
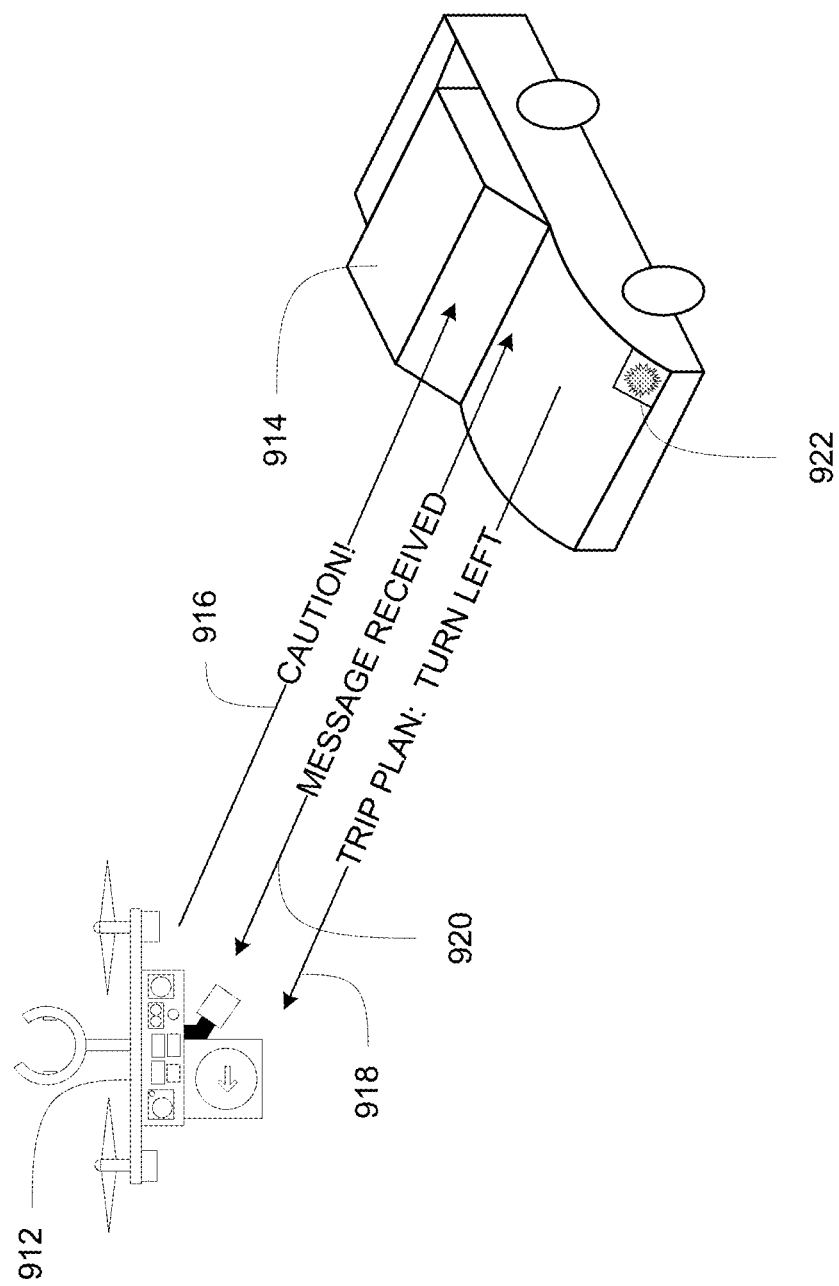
FIG. 9 illustrates an example unmanned aerial vehicle communicating with a non-aerial (e.g., ground bound) vehicle.

FIG. 9 illustrates an example UAV 912 that may be utilized in the example traffic coordination network 112 of FIG. 1 communicating with a non-aerial (e.g., ground bound) vehicle 914. In some examples, the non-aerial vehicle 914 is in communication with the example UAV 912. In some such examples, the example UAV 912 transmits an advisory message 916 "CAUTION!" to the non-aerial vehicle 914. Additionally or alternatively, the non-aerial vehicle 914 transmits a requested vehicle movement message 918 "TRIP PLAN: TURN LEFT" to the example UAV 912. Additionally or alternatively, the example UAV 912 and non-aerial vehicle 914 transmit a receipt confirmation message 920 "MESSAGE RECEIVED" to one another.

In some examples, the example UAV 912 detects a requested vehicle movement signal 922 (e.g., a turn signal, etc.) of the non-aerial vehicle 914. In operation, the example UAV 912 estimates a requested vehicle movement (e.g., with the requested movement estimator 318 of FIG. 3) based on the requested vehicle movement message 918 and/or the requested vehicle movement signal 922.

Additionally or alternatively, some or all of the UAVs of the traffic coordination network 112 of FIG. 1 estimate requested vehicle movements based on requested vehicle movement messages and/or the requested vehicle movement signals.

Figure 10:
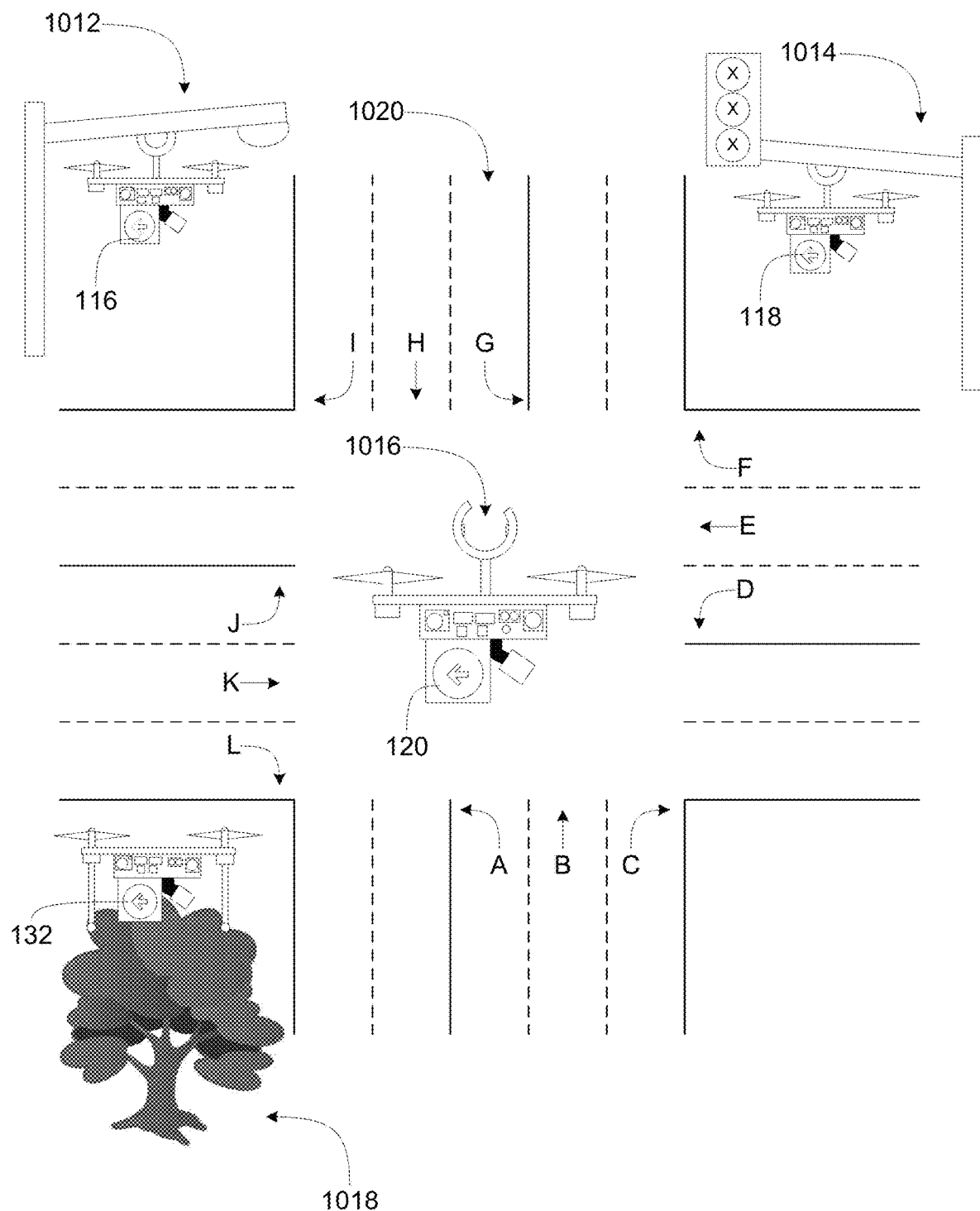
FIG. 10 illustrates example traffic coordination locations for example unmanned aerial vehicles at an example intersection.

FIG. 10 illustrates an example first traffic coordination location 1012, an example second traffic coordination location 1014, an example third traffic coordination location 1016, and an example fourth traffic coordination location example 1018 for the example first, second, third, and fourth UAVs 116, 118, 120, 132 at an example intersection 1020. The first traffic coordination location 1012 is a street light utility pole from which the first UAV 116 is stationed in a hanging position. The second traffic coordination location 1014 is a traffic signal utility pole that is inoperative (as denoted by "X" in the lamps of the traffic signal) from which the second UAV 118 is stationed in a hanging position. The third traffic coordination location 1016 is above the intersection 1020 where the third UAV 120 hovers (e.g., maintains a stationary position in mid-air). The fourth traffic coordination location 1018 is a tree in which the fourth UAV 132 is perched. Global positioning coordinates of the first, second, and fourth traffic coordination locations 1012, 1014, 1018 are stored as intersection data in an intersection data log (e.g., the intersection data log 224 of FIG. 2). In operation, the first, second, and fourth UAVs respectively navigate to the first, second, and fourth traffic coordination locations 1012, 1014, 1018 based on the global positioning coordinates to land on and/or hook onto to the first, second, and fourth traffic coordination locations 1012, 1014, 1018.

The example intersection 1020 includes example vehicle movements "A," "B," "C," "D," "E," "F," "G," "H," "I," "J," "K," and "L." Vehicle movements "A," "D," "G," and "J" are left turns. Vehicle movements "B," "E," "H," and "K" are advancements through the intersection 1020. Vehicle movements "C," "F," "I," and "L" are right turns. Combinations of vehicle movements form traffic interactions, to be described in greater detail in conjunction with FIGS. 11-18.

Figure 11:
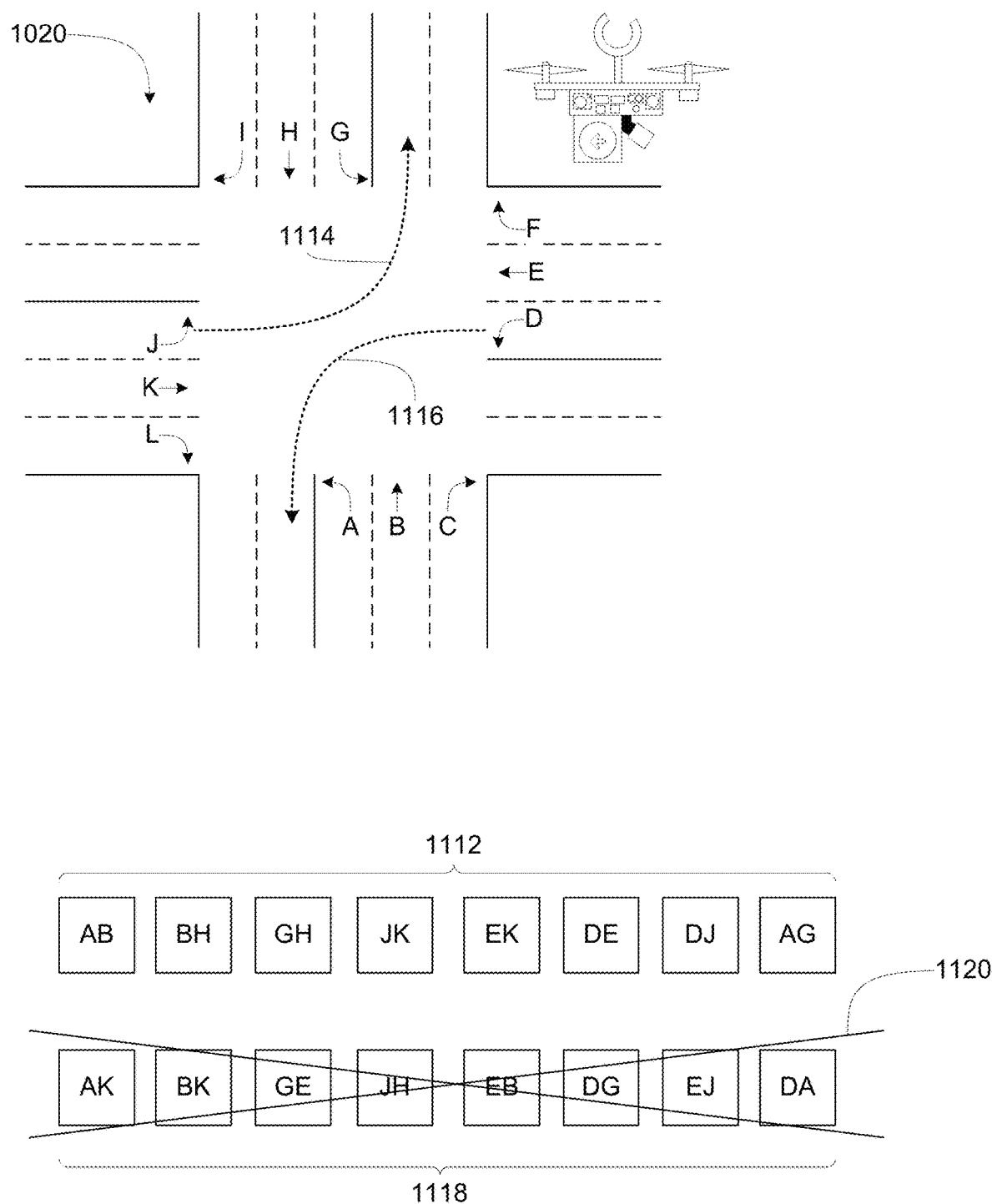
FIG. 11 is a diagram of a set of non-conflicting traffic interactions for the example intersection of FIG. 10.

FIG. 11 is a diagram of a set of non-conflicting traffic interactions 1112 for the example intersection 1020 of FIG. 10. The set of non-conflicting traffic interactions 1112 includes traffic interactions "AB," "BH," GK," "JK," "EK," DE," "DJ," and "AG." In the illustrated example of FIG. 11, a first vehicle stream 1114 follows vehicle movement "J" to turn left through the intersection 1020 and second vehicle stream 1116 follows vehicle movement "D" to turn left through the intersection 1020. In the illustrated example of FIG. 11, the first and second vehicle streams 1114, 1116 do not cross and traffic interaction "DJ" is, thus, a non-conflicting traffic interaction. In the illustrated example of FIG. 11, traffic interactions "AB," "BH," GK," "JK," "EK," DE," "DJ," and "AG" are additional non-conflicting traffic interactions because vehicle streams released through the intersection 1020 following traffic interactions "AB," "BH," GK," "JK," "EK," DE," "DJ," and "AG" will not cross.

In the illustrated example of FIG. 11, a conflicting traffic interactions set 1118, as denoted by cross-out 1120, includes traffic interactions "AK," "BK," GE," "JH," "EB," DG," "EJ," and "DA" because vehicle streams released through the intersection 1020 following traffic interactions "AB," "BH," GK," "JK," "EK," DE," "DJ," and "AG" cross.

Figure 12:
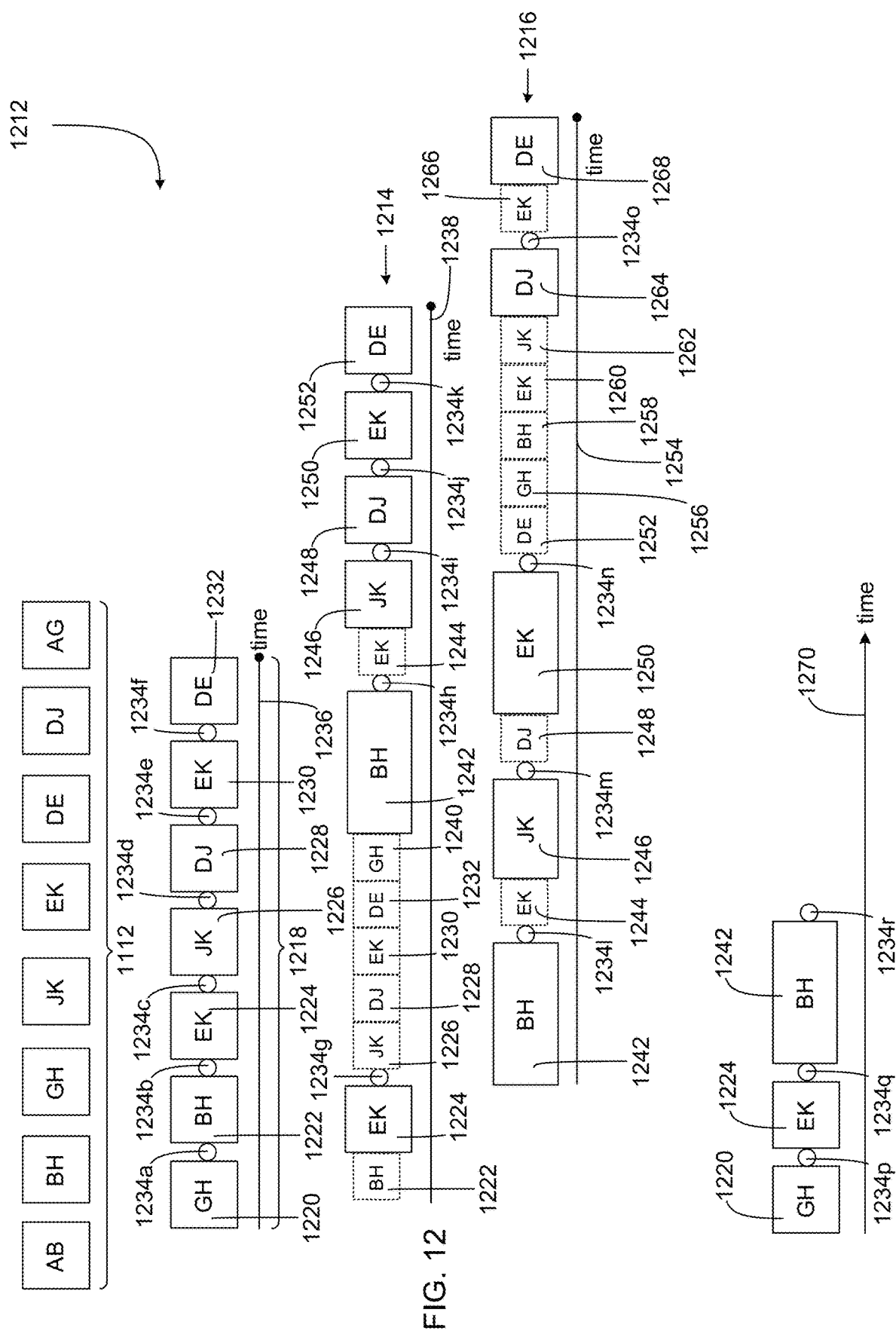
FIG. 12 illustrates an example process to produce example traffic coordination solutions for the example intersection of FIGS. 10-11 that may be executed by the example traffic coordination network and/or the traffic manager of FIGS. 1, 2, and/or 3.

FIG. 12 illustrates an example technique 1212 to produce a first example traffic coordination solution 1214 and a second example traffic coordination solution 1216 for the example intersection 1020 of FIGS. 10-11 that may be executed by the example traffic coordination network 112 and/or the traffic manager 212 of FIGS. 1, 2, and/or 3.

In the illustrated example of FIG. 12, a default non-conflicting traffic interaction green light sequence 1218 is determined from the set of non-conflicting traffic interactions 1112 of FIG. 11 for the intersection 1020 of FIGS. 10-11 prior to deploying the traffic coordination network 112 of FIG. 1 and stored in the traffic interaction data log 226 of FIG. 2. In the illustrated example of FIG. 12, the default non-conflicting traffic interaction green light sequence 1218 includes a set of first, second, third, fourth, fifth, sixth, and seventh stages 1220, 1222, 1224, 1226, 1228, 1230, 1232 in the order "GH, BH, EK, JK, DJ, EK, DE" and clearing durations 1234a, 1234b, 1234c, 1234d, 1234e, 1234f between each of the stages. The first, second, third, fourth, fifth, sixth, and seventh stages 1220, 1222, 1224, 1226, 1228, 1230, 1232 are predetermined green durations for the non-conflicting traffic interactions "GH," "BH," "EK," "JK," "DJ," and "DE." The clearing durations 1234a-1234f are time periods when all traffic coming to the intersection 1020 of FIGS. 10-11 is directed to stop (e.g., an all red light period, etc.) between each non-conflicting traffic interaction "GH," "BH," "EK," "JK," "DJ," and "DE." Additionally or alternatively, a default traffic interaction green light sequence may not include clearing durations.

In the illustrated example of FIG. 12, a default analysis horizon 1236 is determined for the intersection 1020 of FIGS. 10-11 prior to deploying the traffic coordination network 112 of FIG. 1 and stored in the analysis horizon data log 228 of FIG. 2. An analysis horizon (e.g., the default analysis horizon 1236) is a time period (e.g., 10 seconds, 30 seconds, 60 seconds, etc.) for which a traffic coordination solution for an intersection (e.g., the intersection 1020 of FIGS. 10-11) is planned. The default analysis horizon 1236 is determined based on intersection parameters (e.g., a number of lanes of the intersection, geometry of the intersection, topography of the intersection, types of lanes at the intersection, etc.) and traffic parameters (e.g., expected velocities of vehicles approaching the intersection, etc.) of the intersection 1020 of FIGS. 10-11.

In the illustrated example of FIG. 12, the combined durations of the first, second, third, fourth, fifth, sixth, and seventh stages 1220, 1222, 1224, 1226, 1228, 1230, 1232 and the clearing durations 1234a-1234f of the default non-conflicting traffic interaction green light sequence 1218 equal the duration of the default analysis horizon 1236. Additionally or alternatively, default traffic interaction green light sequences and default analysis horizons are respectively determined for some or all of the intersections of the roadway network 114 of FIG. 1.

In the illustrated example of FIG. 12, stages having green durations reduced to zero are depicted in phantom. In operation, the traffic manager 212 of FIGS. 2-3 included in an example UAV (e.g., one or more of the first, second, third, or fourth UAVs 116, 118, 120, 132) deployed to the intersection 1020 retrieves the default non-conflicting traffic interaction green light sequence 1218 from the traffic interaction data log 224 of FIG. 2 (e.g., with the intersection data retriever 316 of FIG. 3). The traffic manager 212 directs the example UAV to display a proceed signal with its traffic signal for traffic interaction "GH" to the intersection 1020 of FIGS. 10-11 (e.g., a green light) based on the first stage 1220. The traffic manager 212 determines a first determined analysis horizon 1238 for the intersection 1020 of FIGS. 10-11 based on intersection and traffic conditions at the intersection 1020 of FIGS. 10-11. The traffic manager 212 then analyzes and selectively modifies or maintains (e.g., increases, decreases, etc.) the green durations of the subsequent stages of the default non-conflicting traffic interaction green light sequence 1218 based on the intersection and traffic conditions to begin generation of the first traffic coordination solution 1214. For example, the green durations of the second, fourth, fifth, sixth, and seventh stages 1222, 1226, 1228, 1230, 1232 are reduced to zero from their respective default green durations. Thus, the second, fourth, fifth, sixth, and seventh stages 1222, 1226, 1228, 1230, 1232 are disabled. Additionally or alternatively, the traffic manager 212 does not modify the green durations of the stages of the default non-conflicting traffic interaction green light sequence 1218. For example, the third stage 1224 is unchanged from its respective default green duration.

In the illustrated example of FIG. 12, to complete generation of the first traffic coordination solution 1214, the traffic manager 212 of FIGS. 2-3 successively analyzes, selectively modifies or maintains, and adds eighth, ninth, tenth, eleventh, twelfth, thirteenth, and fourteenth stages 1240, 1242, 1244, 1246, 1248, 1250, 1252 to the seventh stage 1232 according to the pattern of the first, second, third, fourth, fifth, sixth, and seventh stages 1222, 1226, 1228, 1230, 1232 and inserts clearing durations 1234g, 1234h, 1234i, 1234j, 1234k between the non-zero third, ninth, eleventh, twelfth, thirteenth, and fourteenth stages 1224, 1242, 1246, 1248, 1250, 1252 until the green durations of the second through fourteenth stages 1222-1252 plus the intervening clearing durations 1234g-k fill the first determined analysis horizon 1238.

The example traffic manager 212 directs the example UAV to display another proceed signal with its traffic signal for the traffic interaction "EK" of the intersection 1020 of FIGS. 10-11 (e.g., a green light) based on the third stage 1224 (e.g., the initial non-zero stage of the first traffic coordination solution 1214). The traffic manager 212 determines a second determined analysis horizon 1254 for the intersection 1020 of FIGS. 10-11 based on intersection and traffic conditions at the intersection 1020 of FIGS. 10-11. The traffic manager 212 then, starting with the ninth stage 1242 (e.g., the next non-zero stage of the first traffic coordination solution 1214), analyzes and selectively modifies or maintains the green durations of the subsequent stages of the first traffic coordination solution 1214 based on the intersection and traffic conditions to begin generation of the second traffic coordination solution 1216.

In the illustrated example of FIG. 12, to complete generation of the second traffic coordination solution 1216, the traffic manager 212 of FIGS. 2-3 successively analyzes, selectively modifies or maintains, and adds fifteenth, sixteenth, seventeenth, eighteenth, nineteenth, twentieth, and twenty-first stages 1256, 1258, 1260, 1262, 1264, 1266, 1268 to the fourteen stage 1252 according to the pattern of the first, second, third, fourth, fifth, sixth, and seventh stages 1222, 1226, 1228, 1230, 1232 and inserts clearing durations 1234l, 1234m, 1234n, 1234o between the non-zero ninth, eleventh, thirteenth, nineteenth, and twenty-first stages 1242, 1246, 1250, 1264, 1268 until the green durations of the ninth through twenty-first stages 1242-1268 plus the intervening clearing durations 1234l-o fill the second determined analysis horizon 1254.

The traffic manager 212 directs the example UAV to display another proceed signal with its traffic signal for traffic interaction "BH" of the intersection 1020 of FIGS. 10-11 (e.g., a green light) based on the ninth stage 1242 (e.g., the initial non-zero stage of the second traffic coordination solution 1216).

In the illustrated example of FIG. 12, the displayed traffic interactions "GH," "EK," and "BH" respectively based on the first, third, and ninth stages, 1220, 1224, 1242 and intervening clearing durations 1234p, 1234q, 1234r are collected on a displayed traffic interaction timeline 1270.

Additionally or alternatively, traffic coordination solutions are developed for some or all of the intersections of the roadway network 114 of FIG. 1 by determining analysis horizons, determining repeating stages of available non-conflicting traffic interactions for the intersections, and selectively modifying the green durations of the stages to fill the determined analysis horizons.

Figure 13:
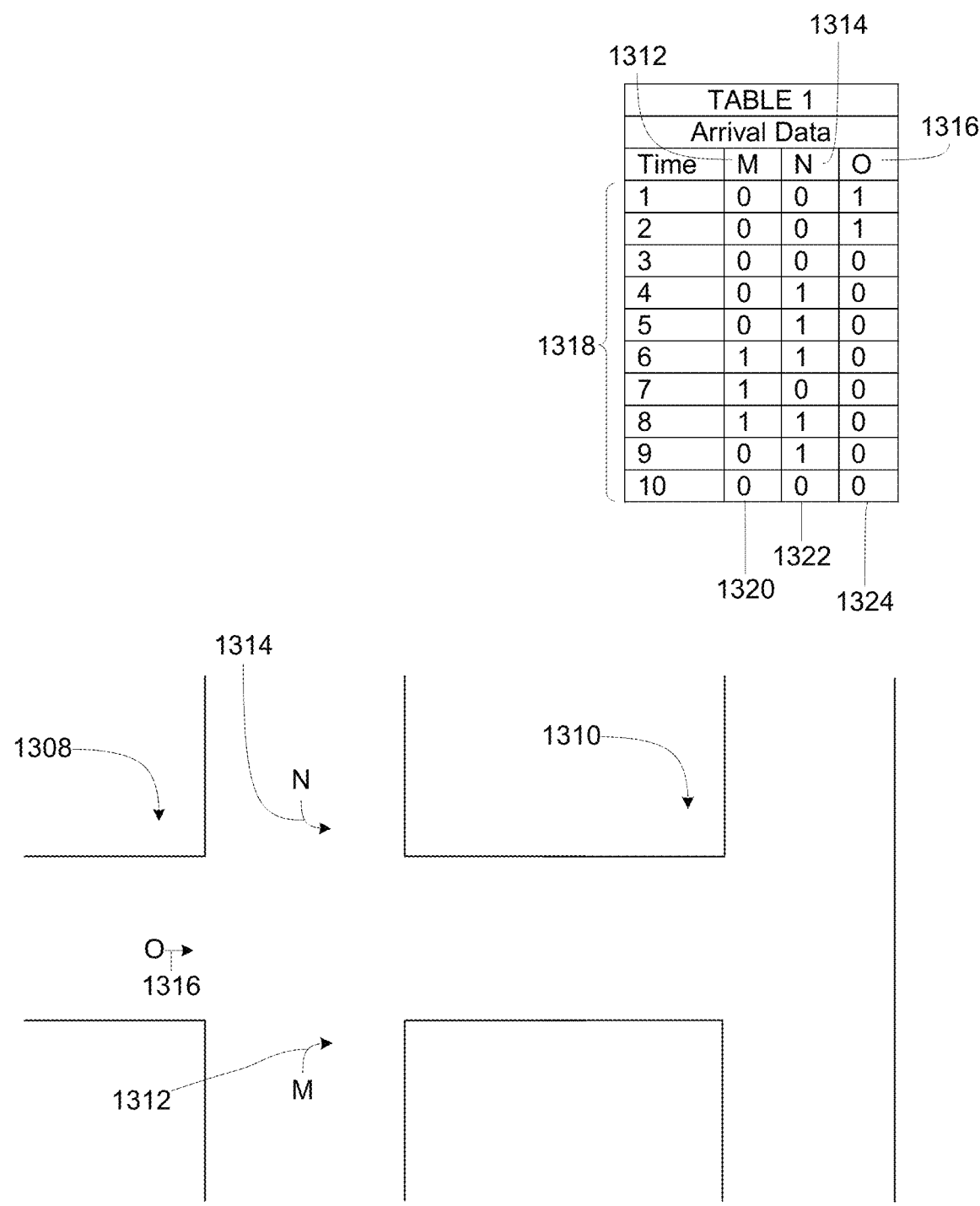

FIG. 13 illustrates an alternative example intersection 1308 and an example first table used to produce an example traffic coordination solution for the alternative example intersection 1308. In the illustrated example of FIG. 13, the alternative example intersection 1308 is connected to an example downstream intersection 1310. The alternative example intersection 1308 is a confluence of three one-way streets and includes a first traffic interaction 1312 "M," a second traffic interaction 1314 "N," and a third traffic interaction 1316 "O." The first traffic interaction 1312 "M" is a right hand turn through the alternative example intersection 1308. The second traffic interaction 1314 "N" is a left hand turn through the alternative example intersection 1308. The third traffic interaction "O" is a straight advancement through the alternative example intersection 1308.

In the illustrated example of FIG. 13, an analysis horizon 1318 of the alternative example intersection is ten time units long (e.g., ten seconds). To generate a first column 1320 "M" of FIG. 13, the traffic manager 212 of FIGS. 2-3 counts vehicles arriving at the intersection per time unit requesting the first traffic interaction 1312. To generate a second column 1322 "N" of FIG. 13, the traffic manager 212 of FIGS. 2-3 counts vehicles arriving at the intersection per time unit requesting the second traffic interaction 1314. To generate a third column 1324 "O" of FIG. 13, the traffic manager 212 of FIGS. 2-3 counts vehicles arriving and stopping at the intersection per time unit requesting the third traffic interaction 1316. For example, one vehicle arrives and stops at the alternative example intersection 1308 requesting the third traffic interaction 1316 "O" at time unit 1. For example, one vehicle arrives and stops at the alternative example intersection 1308 requesting the third traffic interaction 1316 "O" at time unit 2.

In the illustrated examples of FIGS. 14-18, the third traffic interaction 1316 "O" of FIG. 13 is the first stage of a default non-conflicting traffic interaction green light sequence for the alternative example intersection 1308 of FIG. 13.

FIG. 14 illustrates an example second table used to produce the example traffic coordination solution for the alternative example intersection 1308 of FIG. 13. To generate a fourth column 1412 "$s_1$" of the second table of FIG. 14, the traffic manager 212 determines state variables based on the analysis horizon 1318 of FIG. 13. The state variables of the fourth column 1412 indicate a number of time units of the analysis horizon 1318 of FIG. 13 hypothetically allocated to the first stage (e.g., how much of the analysis horizon 1318 stage 1 for the third traffic interaction 1316 "O" is hypothetically chosen to take up).

To generate a fifth column 1414 "$x^*_1(s_1)$" of FIG. 14, the traffic manager 212 of FIGS. 2-3 determines resultant initial green durations given a state variable of the fourth column 1412 (e.g., for how long an example UAV at the alternative example intersection 1308 will display a proceed signal and/or green light to vehicles requesting the third traffic interaction 1316 "O" given a state variable of the fourth column 1412). The traffic manager 212 of FIGS. 2-3 determines the initial green durations "$x^*_1(s_1)$" of the fifth column 1414 using Equation 1, where r is a clearance duration. For the illustrated examples of FIGS. 14-18, r is 1 time unit.

$$x^*_1(s_1) = s_1 - r \qquad \text{Equation 1}$$

To generate a sixth column 1416 "$v_1(s_1)$" of FIG. 14, the traffic manager 212 of FIGS. 2-3 determines resultant cumulative delays of all vehicles at the intersection given state variables "$s_1$" of the fourth column 1412 and initial green durations "$x^*_1(s_1)$" of the fifth column 1414 (e.g., a sum of how long each vehicle will be made to wait at the alternative example intersection 1308 of FIG. 13 during the first stage). The traffic manager 212 of FIGS. 2-3 determines the resultant cumulative delays "$v_1(s_1)$" of the sixth column 1416 using Equation 2, where $\phi \in P$ indicates a traffic interaction $\phi$ belonging to the set of all traffic interactions for an intersection P, and $D\phi(s_1, x^*_1)$ indicates the delay of a vehicle requesting traffic interaction $\phi$ given a state variable of the first stage $s_1$ and a resultant green duration of the first stage $s_1$ (e.g., the longer one traffic interaction $\phi$ is given a green light, the longer vehicles requesting other traffic interactions of P will be delayed while vehicles requesting traffic interaction $\phi$ that has a green light at a given state variable are not delayed).

$$v_1(s_1) = \sum_{\phi \in P} D_\phi(s_1, x^*_1) \qquad \text{Equation 2}$$

FIG. 15 illustrates an example third table used to produce the example traffic coordination solution for the example intersection 1308 of FIG. 13. To generate the example third table of FIG. 15, the traffic manager 212 of FIGS. 2-3 considers delays for vehicles stopped at and departing from the alternative example intersection 1308 of FIG. 13 during a second stage (j=2) (which corresponds to the first traffic interaction 1312 "M" of FIG. 13) of the example traffic coordination solution given a state variable of seven time units ($s_2$=7) (e.g., the traffic manager 212 of FIGS. 2-3 sets the state variable for Stage 2 ("M") at seven time units), as indicated by a first row 1512.

To generate a seventh column 1514 "$x_2$" of FIG. 15, the traffic manager 212 of FIGS. 2-3 determines hypothetical resultant green durations for the second stage (e.g., Stage 2 ("M")) given the set seven time unit stage variable ($s_2$=7). For the illustrated examples of FIGS. 15-18, a minimum green duration for the first, second, and third traffic interactions 1312, 1314, 1316 "M," "N," "O" of FIG. 13 is set at two time units (e.g., if a green light is displayed for any of the first, second, or third traffic interactions 1312, 1314, 1316, it must be displayed for at least two time units). Thus, in the illustrated example of FIG. 15, no value in the seventh column 1514 for "$x_2$" indicates one time unit.

To generate an eighth column 1516 "$s_{j-1}$" of FIG. 15, the traffic manager 212 of FIGS. 2-3 determines feasible stage variables for the preceding stage given the set seven time unit stage variable ($s_2$=7) (e.g., what state variables "$s_1$" of the first column 1412 of FIG. 14 are possible if the second stage of the traffic coordination solution for the example intersection 1308 of FIG. 13 is set to be seven time units long). The eighth column 1516 is thus a portion of the first column 1412 of FIG. 14. The traffic manager 212 of FIGS. 2-3 generates the eighth column 1516 using Equation 3, where, is the number of the stage under consideration (e.g., j=2 for Stage 2 ("M")), $s_1$ is the set state variable for the stage under consideration (e.g., 7), so is the state variable for the stage preceding (e.g., Stage 1 ("O") of FIG. 14), $x_1$ is the hypothetical resultant green duration for the stage under consideration, and r is the clearance duration (e.g., one time unit). For Equation 3, $s_{j-1}$ must be greater than or equal to r (e.g., to allow vehicles in the intersection to clear). For Equation 3, $s_{j-1}$ must be less than or equal to $s_1$, the set state variable for the stage under consideration (e.g., the time allocated from the beginning of the analysis horizon 1318 of FIG. 13 to the previous stage cannot be longer than the time from the beginning of the analysis horizon 1318 of FIG. 13 set to be allocated to the next stage; operations of a preceding stage cannot overlap operations of a next stage). If the traffic manager 212 of FIGS. 2-3 determines $x_j$ to be a negative number, the traffic manager 212 of FIGS. 2-3 sets $x_j$ to equal zero.

$$x_j = s_j - s_{j-1} - r \qquad \text{Equation 3}$$

To generate a ninth column 1518 "$v_{j-1}(s_{j-1})$" of FIG. 15, the traffic manager 212 of FIGS. 2-3 determines resultant cumulative delays of the stages preceding (e.g. "$v_1(s_1)$") of the third column 1416 of FIG. 14) that correspond to the feasible stage variables of the stage preceding "$s_{j-1}$" of the eighth column 1516 (e.g., the values of the third column 1416 "$v_1(s_1)$" of FIG. 14 corresponding to the values of the first column 1412 "$s_1$" of FIG. 14 carried into the eighth column 1516).

To generate a tenth column 1520 "$f_2(7, x_2)$" of FIG. 15, the traffic manager 212 of FIGS. 2-3 determines hypothetical delays for all vehicles at the example intersection 1308 of FIG. 13 during the second stage of the example traffic coordination solution (e.g., Stage 2 ("M")) given the set seven time unit state variable ($s_2$=7) and a hypothetical resultant green duration "$x_2$" of the seventh column 1514. The traffic manager 212 of FIGS. 2-3 generates the tenth column 1520 using Equation 4, where j is the number of the stage (e.g., 2 for Stage 2 ("M")), $\phi \in P$ indicates a traffic interaction $\phi$ belonging to the set of all traffic interactions for the intersection P, and $D\phi(s_j, x_j)$ is the delay of a vehicle requesting traffic interaction $\phi$ given a set state variable of the stage under consideration sj and a hypothetical resultant green duration of the stage under consideration $x_j$.

$$f_j(s_j, x_j) = \sum_{\phi \in P} D_\phi(s_j, x_j)$$ Equation 4

To generate an eleventh column 1522 "$g_2(7, x_2)$" of FIG. 15, the traffic manager 212 of FIGS. 2-3 determines expected hypothetical delays at the example downstream intersection 1310 of FIG. 13 for vehicles released from the example intersection 1308 of FIG. 13 during the second stage of the example traffic coordination solution (e.g., Stage 2 ("M")) given the set seven time unit state variable ($s_2=7$) and a hypothetical resultant green duration "$x_2$" of the seventh column 1514. The traffic manager 212 of FIGS. 2-3 generates the eleventh column 1522 using Equation 5, where j is the number of the stage (e.g., 2 for Stage 2 ("M")), $\phi \in P$ indicates a traffic interaction $\phi$ belonging to the set of all traffic interactions for the intersection P, and $E\phi(s_j, x_j)$ is the expected downstream intersection delay of a vehicle released via traffic interaction $\phi$ given a set state variable of the stage under consideration sj and a hypothetical resultant green duration of the stage under consideration $x_j$.

$$g_j(s_j, x_j) = \sum_{\phi \in P} E_\phi(s_j, x_j)$$ Equation 5

To generate a twelfth column 1524 "$v_2(7)=f_2(7, x_2)+g_2(7, x_2)+v_{j-1}(s_{j-1})$" of FIG. 15, the traffic manager 212 of FIGS. 2-3 determines hypothetical combined delays of all vehicles stopped at and departing from the example intersection 1308 during the second stage of the example traffic coordination solution (e.g., Stage 2 ("M")) given the set seven time unit state variable ($s_2=7$) and a hypothetical resultant green duration "$x_2$" of the seventh column 1514 (e.g., the respective sums of the ninth, tenth, and eleventh columns 1518, 1520, 1522). The traffic manager 212 of FIGS. 2-3 generates the twelfth column 1524 using Equation 6, where j is the number of the stage (e.g., 2 for Stage 2 ("M")), $s_j$ is a set state variable of the stage under consideration and $x_j$ is a hypothetical resultant green duration of the stage under consideration.

$$v_j(s_j)=f_j(s_j,x_j)+g_j(s_j,x_j)+v_{j-1}(s_{j-1})$$ Equation 6

To locate a first row 1526 of FIG. 15, the traffic manager 212 of FIGS. 2-3 determines a first least hypothetical combined delay value 1528 (e.g., 10) in the twelfth column 1524. The traffic manager 212 of FIGS. 2-3 locates a corresponding hypothetical resultant green duration 1530 (e.g., 2) in the first row 1526. The traffic manager 212 of FIGS. 2-3 saves the first least hypothetical combined delay value 1528 and the corresponding hypothetical resultant green duration 1530 under the state variable of seven time units ($s_2=7$) as a possible solution for the second stage of the example traffic coordination solution for the example intersection 1310 of FIG. 13. The traffic manager 212 of FIGS. 2-3 then repeats the technique of determining hypothetical combined delays of all vehicles stopped at and departing from the example intersection 1310 for all the state variable time units (e.g., one through ten, etc.) in the analysis horizon 1318 of FIG. 13 for the stage second stage of the example traffic coordination solution for the example intersection 1310.

The traffic manager 212 of FIGS. 2-3 considers the next stage (e.g., a third stage) of the default non-conflicting traffic interaction green light sequence of the example intersection 1310 of FIG. 13. The traffic manager 212 of FIGS. 2-3 determines least hypothetical combined delays for all vehicles stopped at and departing from the example intersection 1310 of FIG. 13 and corresponding hypothetical resultant green durations for the next stage of the default non-conflicting traffic interaction green light sequence of the example intersection 1310 (e.g., as in the first row 1526). In other words, the traffic manager 212 of FIGS. 2-3 determines how long vehicles stopped at and departing from the example intersection 1308 will be delayed at the example intersection 1308 and/or the downstream intersection 1310 if increasing green light durations are given to the next stage, dependent upon the green light durations given to the stage preceding.

FIG. 16 illustrates an example fourth table used to produce the example traffic coordination solution for the example intersection 1308 of FIG. 13. To generate a thirteenth row 1612 "v2(s2)" of FIG. 16, the traffic manager 212 of FIGS. 2-3 compiles least hypothetical combined delays for the second stage of the example traffic coordination solution for the example intersection 1308 (e.g., Stage 2 ("M")) for all the state variable time units of the analysis horizon 1318 of FIG. 13. To generate a fourteenth column 1614 "x*2(s2)" of FIG. 16, the traffic manager 212 of FIGS. 2-3 compiles hypothetical resultant green durations corresponding to the compiled least hypothetical combined delays "v2(s2)" of the thirteenth column 1612. For example, a second row 1616 includes the first least hypothetical combined delay value 1528 and the corresponding hypothetical resultant green duration 1530 under the state variable of seven time units (s2=7) of FIG. 15.

FIG. 17 illustrates an example fifth table used to produce the example traffic coordination solution for the example intersection 1308 of FIG. 13. To generate a fifteenth column 1712, a sixteenth column 1714, a seventeenth column 1716, an eighteenth column 1718, a nineteenth column 1720, a twentieth column 1722, and a twenty-first column 1724 of FIG. 17, the traffic manager 212 of FIGS. 2-3 compiles the least hypothetical combined delays for all the state variable time units of the analysis horizon 1318 of FIG. 13 for the first stage through a seventh stage of the traffic coordination solution of the example intersection 1308 of FIG. 13. The traffic manager 212 of FIGS. 2-3 analyzes the least hypothetical combined delays for last time unit "10" of analysis horizon 1318 of FIG. 13 across the first through seventh stages "v1,"-"v7," as indicated by a third row 1726 of FIG. 17. To cease ceases compiling least hypothetical combined delays, the traffic manager 212 of FIGS. 2-3 determines that a second least hypothetical combined delay value 1728 "8" of the third row 1726 is not less than a third least hypothetical combined delay value 1730 "8" of the third row 1726. In other words, the traffic manager 212 of FIGS. 2-3 compiles least hypothetical combined delays until the traffic manager 212 of FIGS. 2-3 determines that the least hypothetical combined delays at the end of the analysis horizon 1318 of FIG. 13 no longer decrease.

Figure 18:
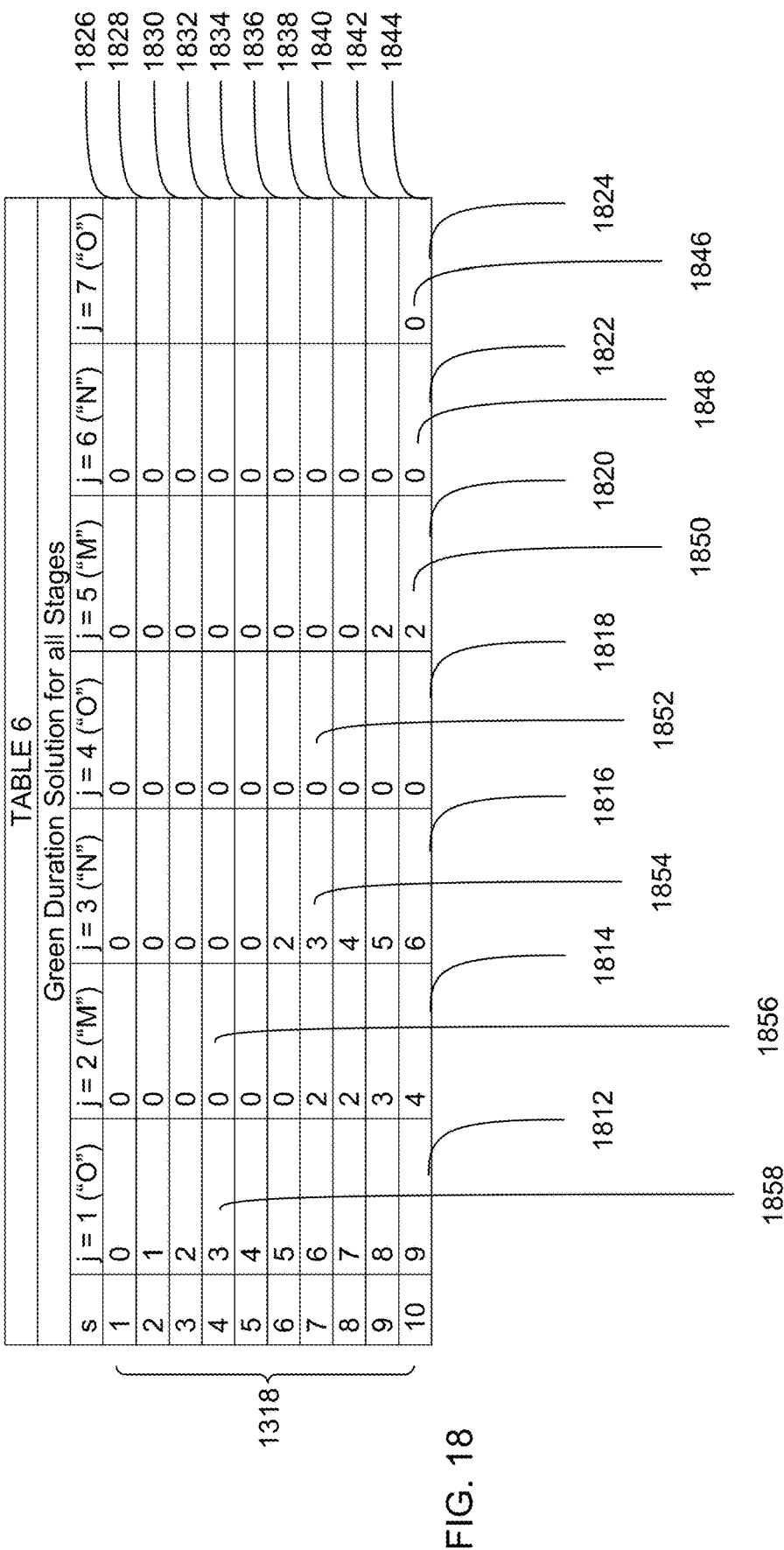

FIG. 18 illustrates an example sixth table used to produce the example traffic coordination solution for the example intersection 1308 of FIG. 13. To generate a twenty-second column 1812, a twenty-third column 1814, a twenty-fourth column 1816, a twenty-fifth column 1818, a twenty-sixth column 1820, a twenty-seventh column 1822, and a twenty-eighth column 1824 of FIG. 18, the traffic manager 212 of FIGS. 2-3 compiles the hypothetical resultant green durations corresponding to the least hypothetical combined delays of the fifteenth, sixteenth, seventeenth, eighteenth, nineteenth, twentieth, and twenty-first columns 1712, 1714, 1716, 1718, 1720, 1722 of FIG. 17.

In the illustrated example of FIG. 18, a fourth row 1826, a fifth row 1828, a sixth row 1830, a seventh row 1832, an eighth row 1834, a ninth row 1836, a tenth row 1838, an eleventh row 1840, a twelfth row 1842, and a thirteenth row 1844 indicate the hypothetical resultant green durations of time units 1-10 of the analysis horizon 1318 across the first through the seventh stages corresponding to the least hypothetical combined delays of FIG. 17.

To recursively analyze table 6 of FIG. 18, the traffic manager 212 of FIGS. 2-3 locates a first cell 1846, the intersection of the twenty-eighth column 1824 (e.g., stage 7) and the thirteenth row 1844 (e.g., time unit 10).

To continue recursively analyzing table 6 of FIG. 18, after finding a zero value in the first cell 1846, the traffic manager 212 of FIGS. 2-3 progresses to a second cell 1848, the intersection of the twenty-seventh column 1822 (e.g., stage 6) and the thirteenth row 1844 (e.g., time unit 10). The traffic manager 212 of FIGS. 2-3 saves the zero time unit value of the first cell 1846 as the actual green duration for the seventh stage of the traffic coordination solution for the example intersection 1308 of FIG. 13.

To continue recursively analyzing table 6 of FIG. 18, after finding a zero value in the second cell 1848 the traffic manager progresses to a third cell 1850, the intersection of the twenty-sixth column 1820 (e.g., stage 5) and the thirteenth row 1844 (e.g., time unit 10). The traffic manager 212 of FIGS. 2-3 saves the zero time unit value of the second cell 1848 as the actual green duration for the sixth stage of the traffic coordination solution for the example intersection 1308 of FIG. 13.

To continue recursively analyzing table 6 of FIG. 18, after finding a nonzero value in the third cell 1850, the traffic manager 212 of FIGS. 2-3 subtracts the 2 time unit value of the third cell 1850 and the 1 time unit clearance duration from the 10 time unit value of the thirteenth row 1844 to determine that the 7 time unit value tenth row 1838 is the next row for analysis. The traffic manager 212 of FIGS. 2-3 saves the 2 time unit value of cell 1850 as the actual green duration for the fifth stage of the traffic coordination solution for the example intersection 1308 of FIG. 13.

To continue recursively analyzing table 6 of FIG. 18, the traffic manager 212 of FIGS. 2-3 progresses to a fourth cell 1852, the intersection of the twenty-fifth column 1818 (e.g., stage 4) and the tenth row 1838 (e.g., time unit 7).

I To continue recursively analyzing table 6 of FIG. 18, after finding a zero value in the fourth cell 1852, the traffic manager 212 of FIGS. 2-3 progresses to a fifth cell 1854, the intersection of the twenty-fourth column 1816 (e.g., stage 3) and the tenth row 1838 (e.g., time unit 7). The traffic manager 212 of FIGS. 2-3 saves the zero time unit value of the fourth cell 1852 as the actual green duration for the fourth stage of the traffic coordination solution for the example intersection 1308 of FIG. 13.

To continue recursively analyzing table 6 of FIG. 18, after finding a nonzero value in a fifth cell 1854, the traffic manager subtracts the 3 time unit value of the fifth cell 1854 and the 1 time unit clearance duration from the 7 time unit value of the tenth row 1838 to determine that the 3 time unit value sixth row 1830 is the next row for analysis. The traffic manager 212 of FIGS. 2-3 saves the 3 time unit value of cell 1854 as the actual green duration for the third stage of the traffic coordination solution for the example intersection 1308 of FIG. 13.

To continue recursively analyzing table 6 of FIG. 18, the traffic manager 212 of FIGS. 2-3 progresses to a sixth cell 1856, the intersection of the twenty-third column 1814 (e.g., stage 2) and the sixth row 1830 (e.g., time unit 3).

To continue recursively analyzing table 6 of FIG. 18, after finding a zero value in the sixth cell 1856 the traffic manager progresses to a seventh cell 1858, the intersection of the twenty-second column 1812 (e.g., stage 1) and the sixth row 1830 (e.g., time unit 3). The traffic manager 212 of FIGS. 2-3 saves the zero time unit value of the sixth cell 1856 as the actual green duration for the second stage of the traffic coordination solution for the example intersection 1308 of FIG. 13.

To finish recursively analyzing table 6 of FIG. 18, after finding a nonzero value in the seventh cell 1858, the traffic manager saves the 2 time unit value of the seventh cell 1858 as the actual green duration for the first stage of the traffic coordination solution for the example intersection 1308 of FIG. 13.

Figure 19:
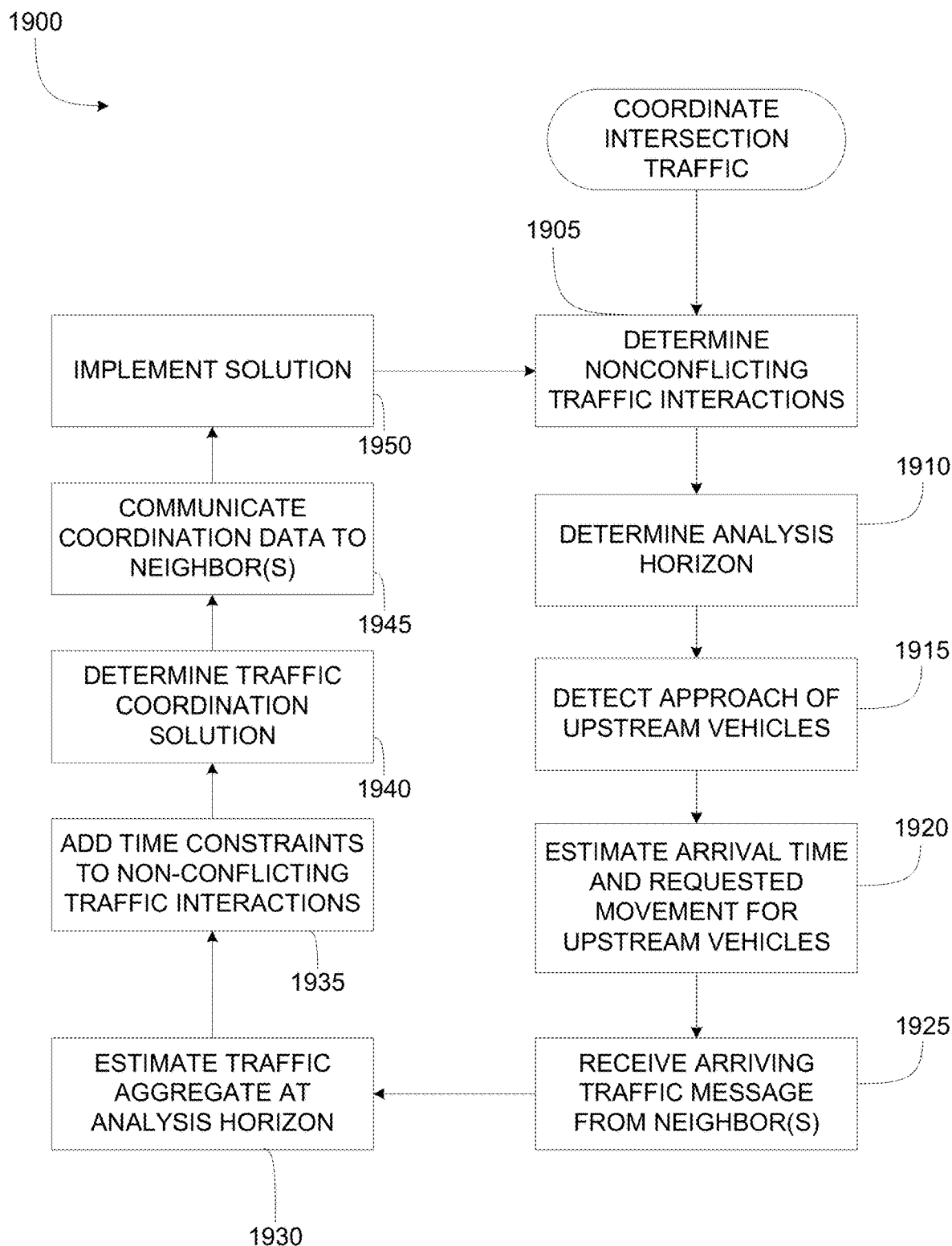
FIG. 19 is a flowchart representative of example machine-readable instructions that may be executed to implement the example traffic manager of FIGS. 2 and/or 3.

FIG. 19 is a flowchart representative of example machine-readable instructions 1900 that may be executed to implement the example traffic manager 212 of FIGS. 2 and/or 3. The example instructions 1900 may be operative to, for example, coordinate traffic at an intersection.

To start, the intersection conditions analyzer 320 of FIG. 3 (e.g., implemented in the example first UAV 116) determines non-conflicting traffic interactions of the intersection (block 1905). Next, the analysis horizon determiner 324 of FIG. 3 determines an analysis horizon for the intersection (block 1910). Then, the intersection conditions detector 312 of FIG. 3 detects approaches of upstream (e.g., oncoming) vehicles to the intersection (block 1915). Next, the arrival time estimator 314 of FIG. 3 estimates arrival times at the intersection for the upstream vehicles and the requested movement estimator 318 of FIG. 3 estimates requested vehicle movements of the upstream vehicles (block 1920). Then, traffic aggregator 326 of FIG. 3 of FIG. 3 receives an arriving traffic message via the communication interface 230 (e.g., estimated arrival times of additional upstream vehicles) from a neighboring UAV (e.g., the example second UAV 118) (block 1925). Next, the traffic aggregator 326 of FIG. 3 determines a traffic aggregate based on the estimated arrival times and the arriving traffic message (block 1930). Then, the traffic interaction time adjuster 322 of FIG. 3 adds time constraints to the non-conflicting traffic interactions (block 1935). Next, the traffic interaction sequencer 328 of FIG. 3 determines a traffic coordination solution for the intersection (block 1940). Then, traffic interaction sequencer 328 of FIG. 3 communicates the traffic coordination data via the communication interface 230 of FIG. 3 to the neighbor UAV (e.g., the example second UAV 118) (block 1945). Next, the traffic director 330 of FIG. 3 implements the traffic coordination solution (block 1950). For example, the traffic director 330 commands a traffic signal (e.g., implemented in the first UAV 116) to display a green light according to the traffic coordination solution. For example, the traffic director 330 The instructions 1900 of FIG. 19 then return control to block 1905.

Figure 20:
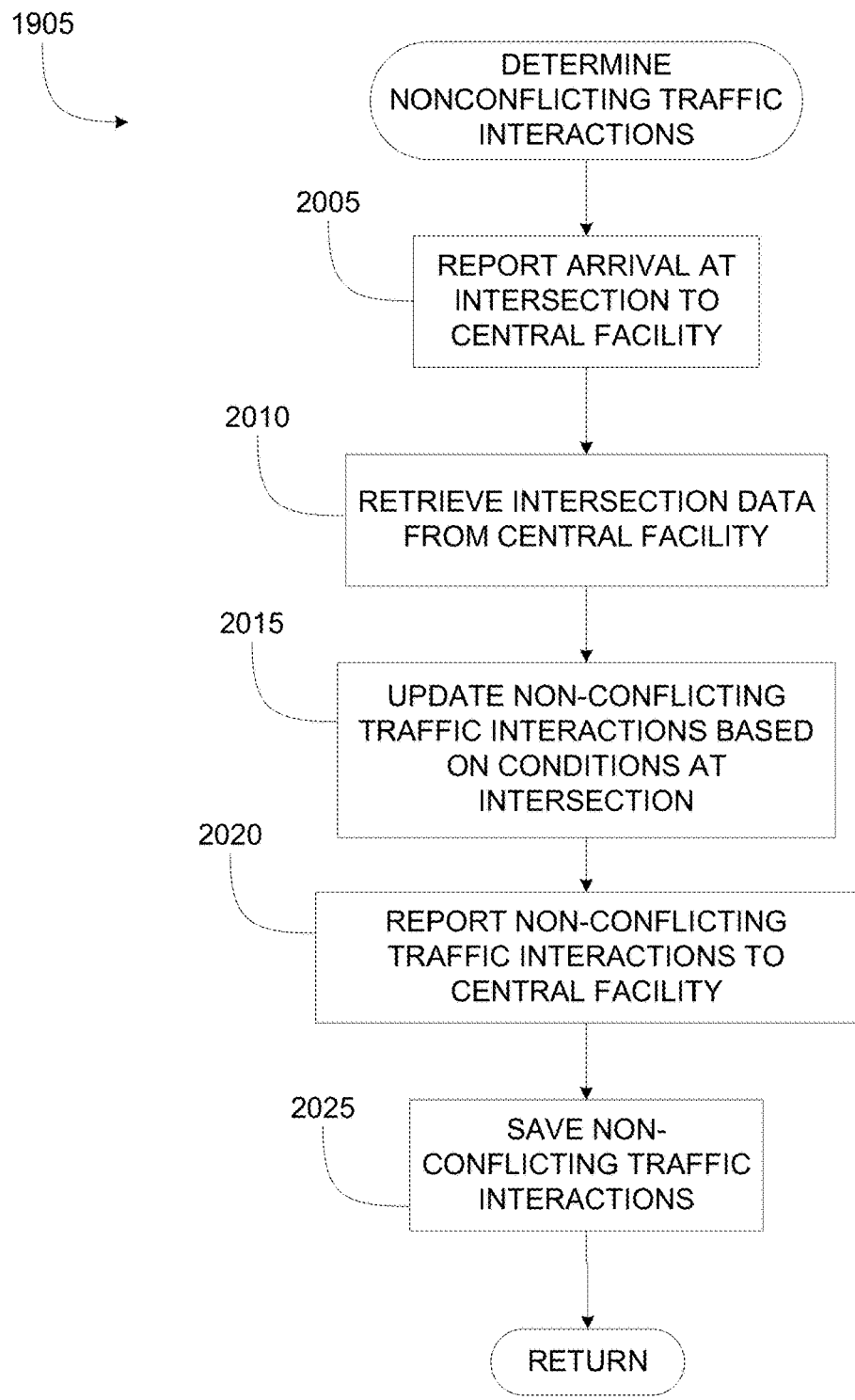
FIG. 20 is a flowchart representative of example machine-readable instructions that may be executed to implement block 1905 of the example machine-readable instructions of FIG. 19.

FIG. 20 is a flowchart representative of example machine-readable instructions that may be executed to implement block 1905 of the example machine-readable instructions of FIG. 19 to determine non-conflicting traffic interactions of the intersection. The intersection data retriever 316 reports arrival of a UAV (e.g., the first UAV 116) that includes the example traffic manager 212 at an intersection (e.g., the example first intersection 122) via the communication interface 230 to the example central facility 216 (block 2005). Next, the intersection data retriever 316 retrieves intersection data including, in some examples, intersection geometry, a number of lanes at the intersection, topography of the intersection, and/or non-conflicting traffic interactions of the intersection from the central facility 216 (block 2010). Then, the intersection conditions analyzer 320 updates (e.g., determines) the non-conflicting traffic interactions based on conditions at the intersection (e.g., a accident blocking a lane of the intersection, construction at the intersection, etc.) provided by the intersection conditions detector 312 (block 2015). Next, the intersection conditions analyzer 320 reports the updated non-conflicting traffic interactions to the central facility via the communication interface 230 (block 2020). Then, the intersection conditions analyzer 320 saves the updated non-conflicting traffic interactions (block 2025). The instructions 1905 of FIG. 20 end and control returns to block 1910 of FIG. 19.

Figure 21:
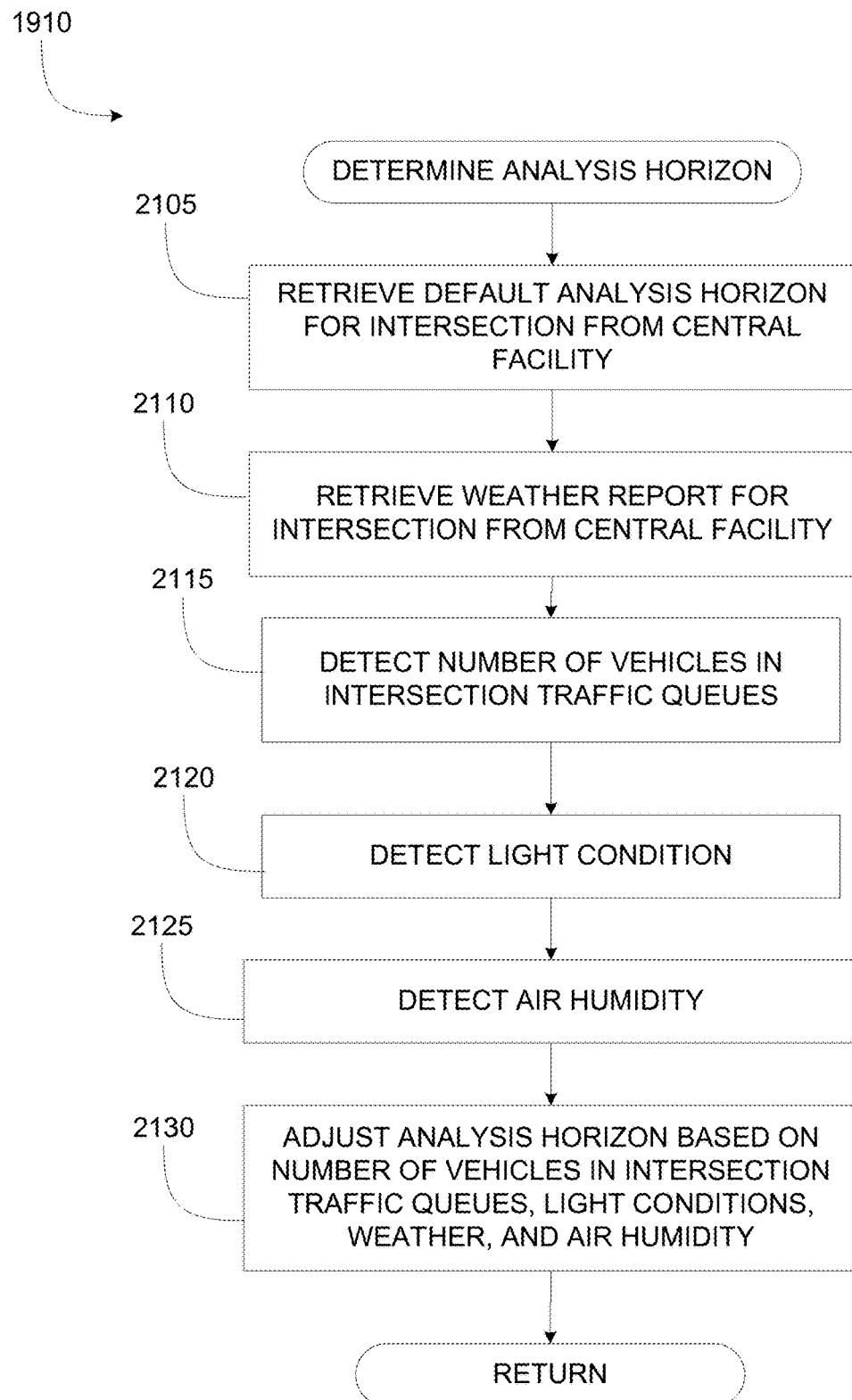
FIG. 21 is a flowchart representative of example machine-readable instructions that may be executed to implement block 1910 of the example machine-readable instructions of FIG. 19.

FIG. 21 is a flowchart representative of example machine-readable instructions that may be executed to implement block 1910 of the example machine-readable instructions of FIG. 19 to determine an analysis horizon for the intersection. The example intersection data retriever 316 of FIG. 3 retrieves a default analysis horizon for the intersection from the central facility (block 2105). Then, the intersection data retriever 316 retrieves a weather report from the example central facility 216 (block 2110). Next, the intersection conditions detector 312 detects a number of vehicles in the traffic queues of the intersection (block 2115). Then, the intersection conditions detector 312 detects a light condition (e.g., low light, night, day, cloudy, etc.) of the intersection (block 2120). According to the illustrated example, the intersection conditions detector 312 then detects air humidity at the intersection condition (e.g., snow, rain, precipitation, etc.) (block 2125). Next, the analysis horizon determiner 324 adjusts the default analysis horizon based on the number of vehicles in the traffic queues of the intersection, the light condition, the air humidity, and the weather report (block 2130). The instructions 1910 of FIG. 21 end and control returns to block 1915 of FIG. 19. While, according to FIG. 3, the analysis horizon determiner 324 considers traffic queues, light conditions, air humidity, and the weather report, the analysis horizon determiner 324 may alternatively consider only some of the identified criteria and/or may consider other criteria.

Figure 22:
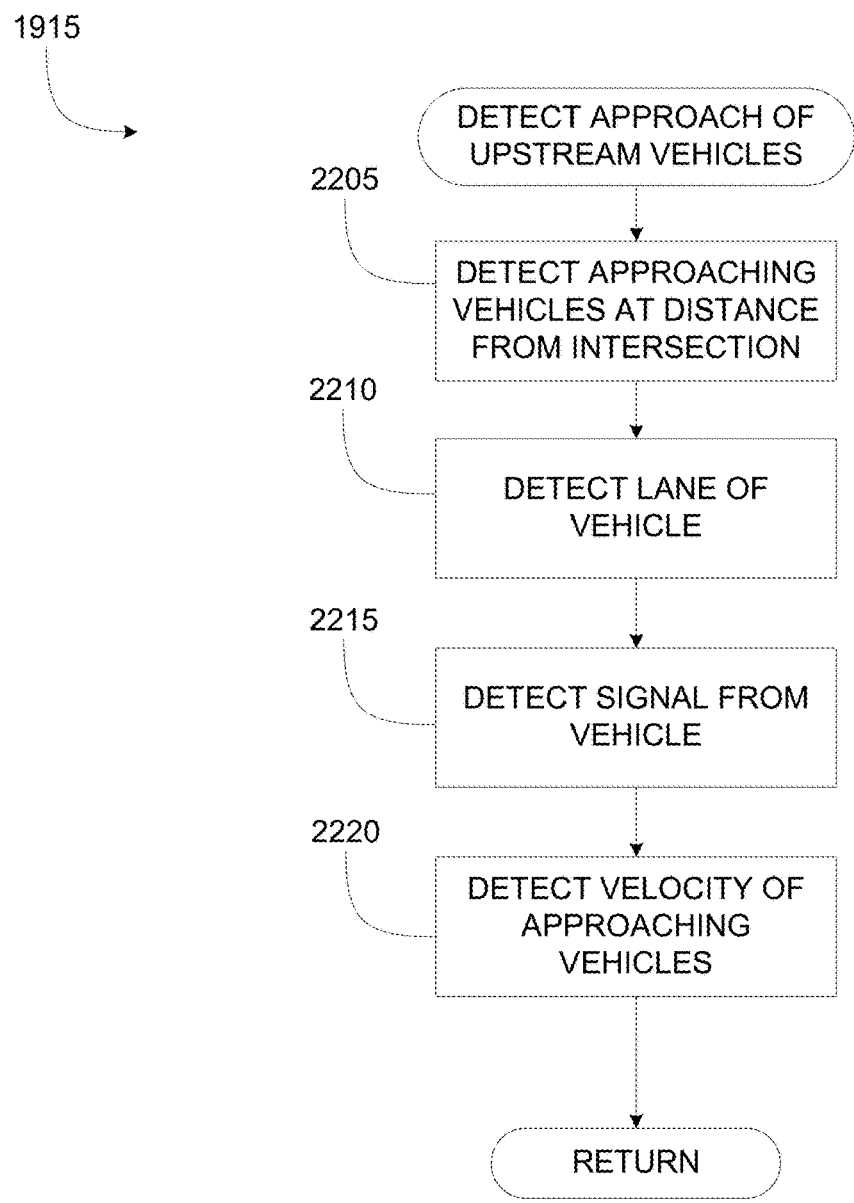
FIG. 22 is a flowchart representative of example machine-readable instructions that may be executed to implement block 1915 of the example machine-readable instructions of FIG. 19.

FIG. 22 is a flowchart representative of example machine-readable instructions that may be executed to implement block 1915 of the example machine-readable instructions of FIG. 19 to detect approaches of vehicles upstream of the intersection. The example intersection conditions detector 312 of FIG. 3 detects an approaching vehicle at a first distance from the intersection (block 2205). Then, the intersection conditions detector 312 detects a lane of the approaching vehicle (block 2210). Next, the intersection conditions detector 312 detects a signal from the vehicle (block 2215). Then, the intersection conditions detector 312 detects velocities of approaching vehicles (block 2220). The instructions 1915 of FIG. 22 end and control returns to block 1920 of FIG. 19.

Figure 23:
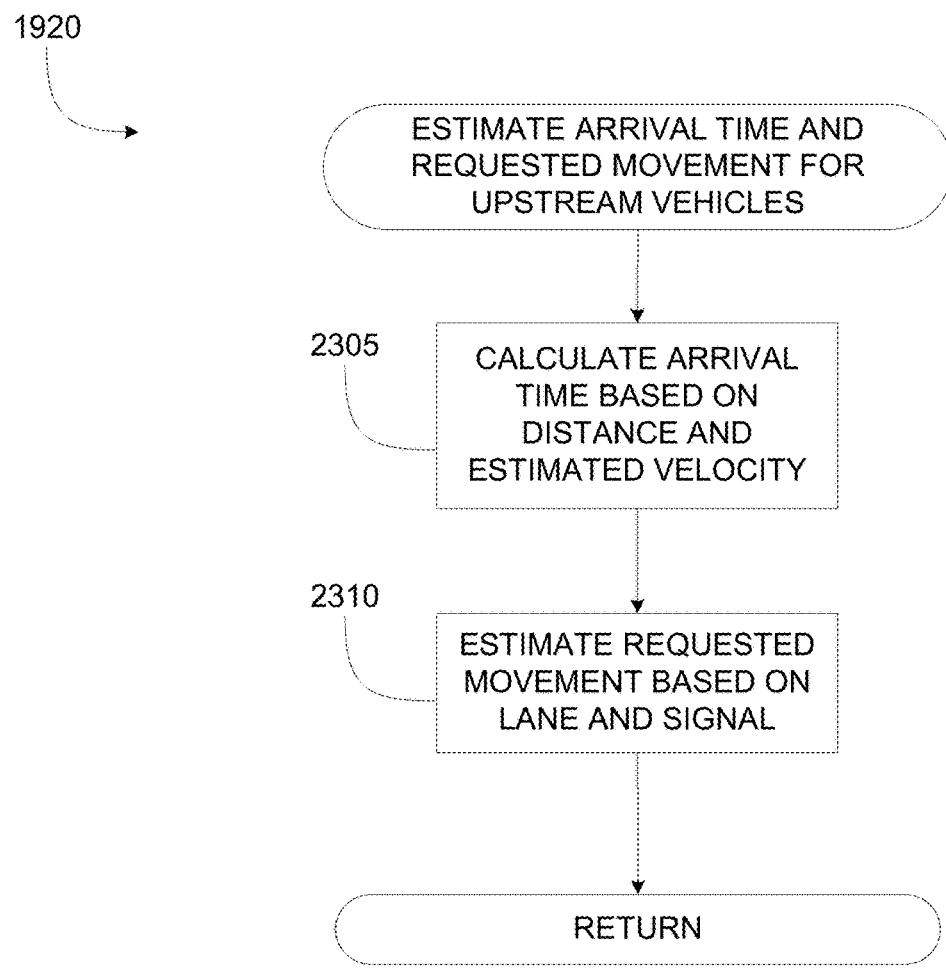
FIG. 23 is a flowchart representative of example machine-readable instructions that may be executed to implement block 1920 of the example machine-readable instructions of FIG. 19.

FIG. 23 is a flowchart representative of example machine-readable instructions that may be executed to implement block 1920 of the example machine-readable instructions of FIG. 19 to estimate arrival times and requested movements for vehicles upstream of the intersection. The example arrival time estimator 314 of FIG. 3 calculates an estimated arrival time of the vehicle based on the velocity of the vehicle and the first distance (block 2305). Next, the example requested movement estimator 318 of FIG. 3 estimates a requested vehicle movement based on the lane of the vehicle and/or the signal (block 2310). The instructions 1920 of FIG. 23 end and control returns to block 1925 of FIG. 19.

Figure 24:
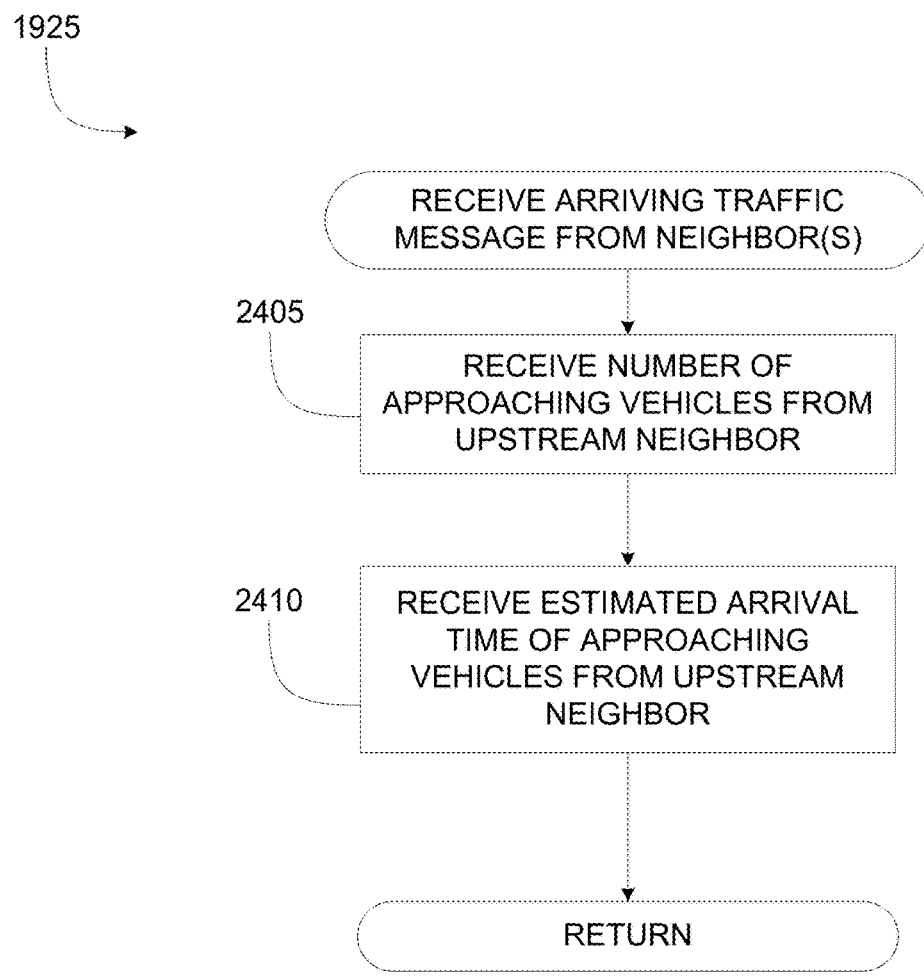
FIG. 24 is a flowchart representative of example machine-readable instructions that may be executed to implement block 1925 of the example machine-readable instructions of FIG. 19.

FIG. 24 is a flowchart representative of example machine-readable instructions that may be executed to implement block 1925 of the example machine-readable instructions of FIG. 19 to receive an arriving traffic message from a neighboring UAV. The example communication interface 230 of FIGS. 2-3 receives a number of approaching vehicle(s) from a neighboring upstream UAV (e.g., the first UAV 116) (block 2405). Then, the communication interface 230 receives estimated arrival times of the approaching vehicle(s) from the neighboring upstream UAV (block 2410). The instructions 1925 of FIG. 24 end and control returns to block 1930 of FIG. 19.

Figure 25:
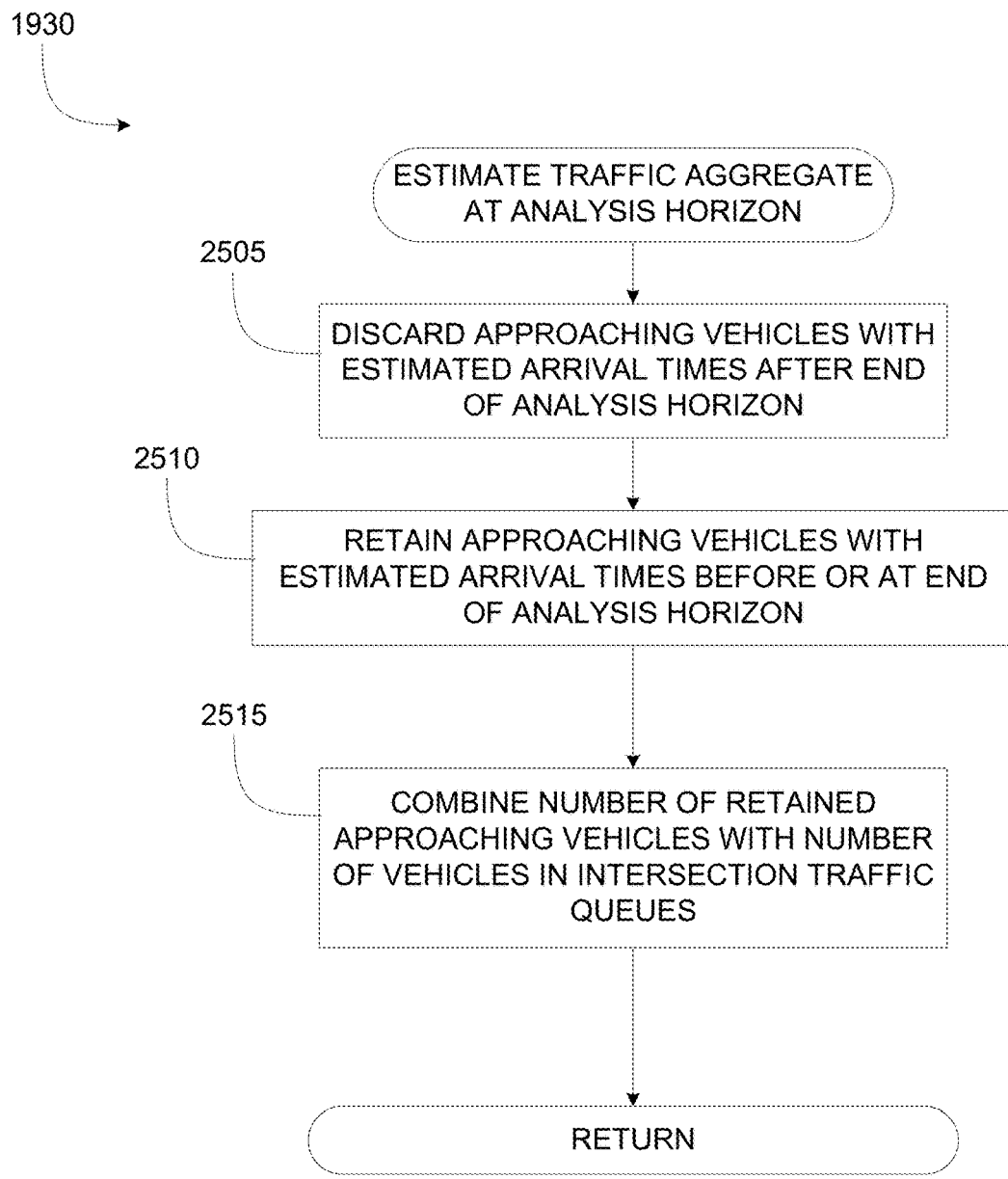
FIG. 25 is a flowchart representative of example machine-readable instructions that may be executed to implement block 1930 of the example machine-readable instructions of FIG. 19.

FIG. 25 is a flowchart representative of example machine-readable instructions that may be executed to implement block 1930 of the example machine-readable instructions of FIG. 19 to estimate a traffic aggregate at the analysis horizon of the intersection. The traffic aggregator 326 ignores (e.g., discards) approaching vehicle(s) with estimated arrival times after the end of the analysis horizon determine by the analysis horizon determiner 324 (block 2505). Then, the example traffic aggregator 326 counts (e.g., retains) approaching vehicle(s) with estimated arrival times before or at the end of the analysis horizon (block 2510). Next, the example traffic aggregator 326 combines the number of retained approaching vehicle with the number of vehicles in intersection traffic queues (block 2515). The instructions 1930 of FIG. 25 end and control returns to block 1935 of FIG. 19.

Figure 26:
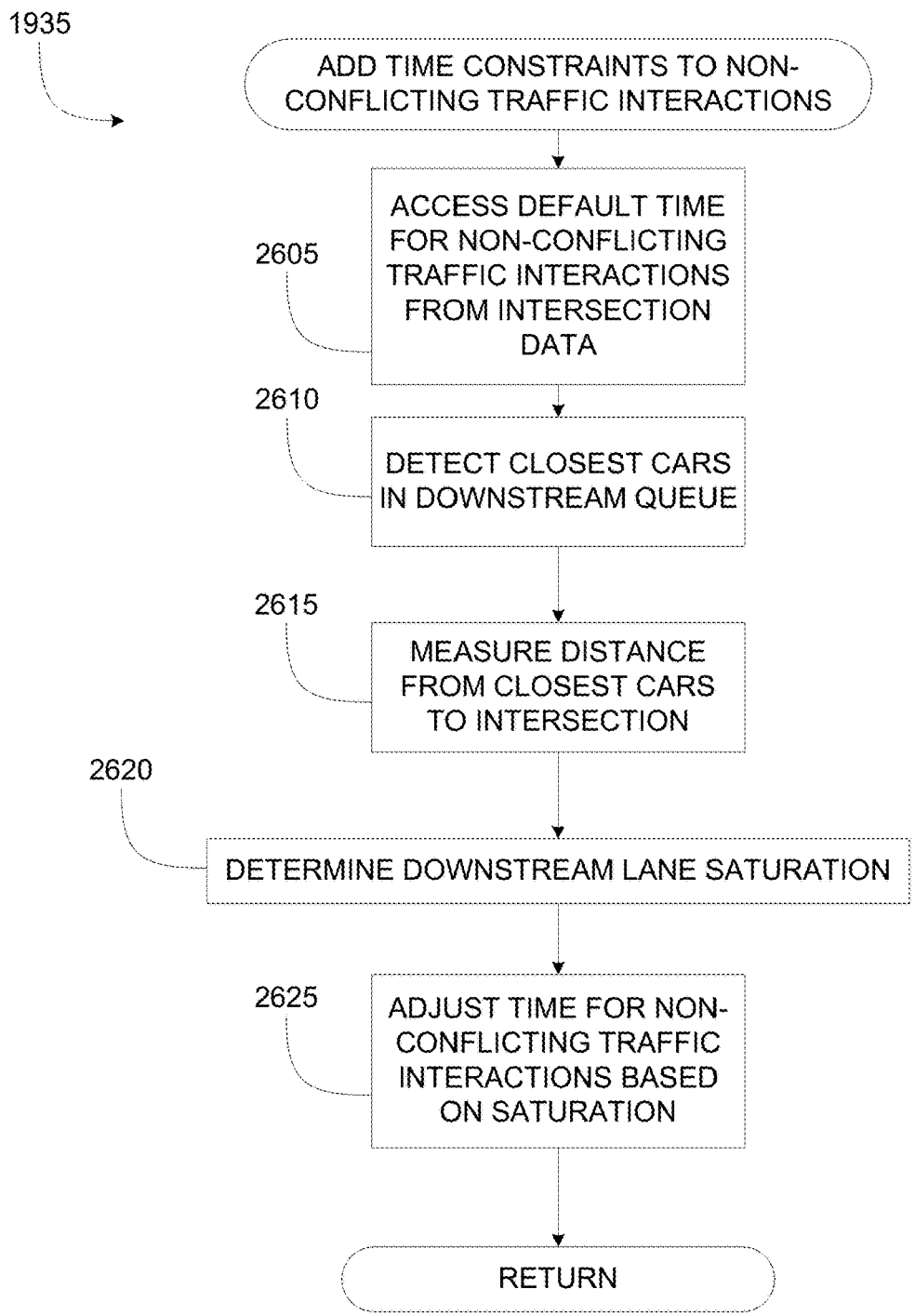
FIG. 26 is a flowchart representative of example machine-readable instructions that may be executed to implement block 1935 of the example machine-readable instructions of FIG. 19.

FIG. 26 is a flowchart representative of example machine-readable instructions that may be executed to implement block 1935 of the example machine-readable instructions of FIG. 19 to add time constraints to the non-conflicting traffic interactions of the intersection. The example intersection conditions analyzer 320 of FIG. 3 accesses default times for non-conflicting traffic interactions of the intersection (e.g., predetermined green light durations) from the intersection data (block 2605). Then, the intersection conditions detector 312 detects the closest vehicles in a downstream intersection traffic queue (block 2610). Next, the intersection conditions analyzer 320 measures a second distance from the closest downstream vehicle to the intersection (block 2615). Then, the intersection conditions analyzer 320 determines a downstream lane saturation (block 2620). Next, the traffic interaction time adjuster 322 adjusts proceed signal (e.g., green light) durations of the default non-conflicting traffic interactions based on the downstream lane saturation (block 2625). The instructions 1935 of FIG. 26 end and control returns to block 1940 of FIG. 19.

Figure 27:
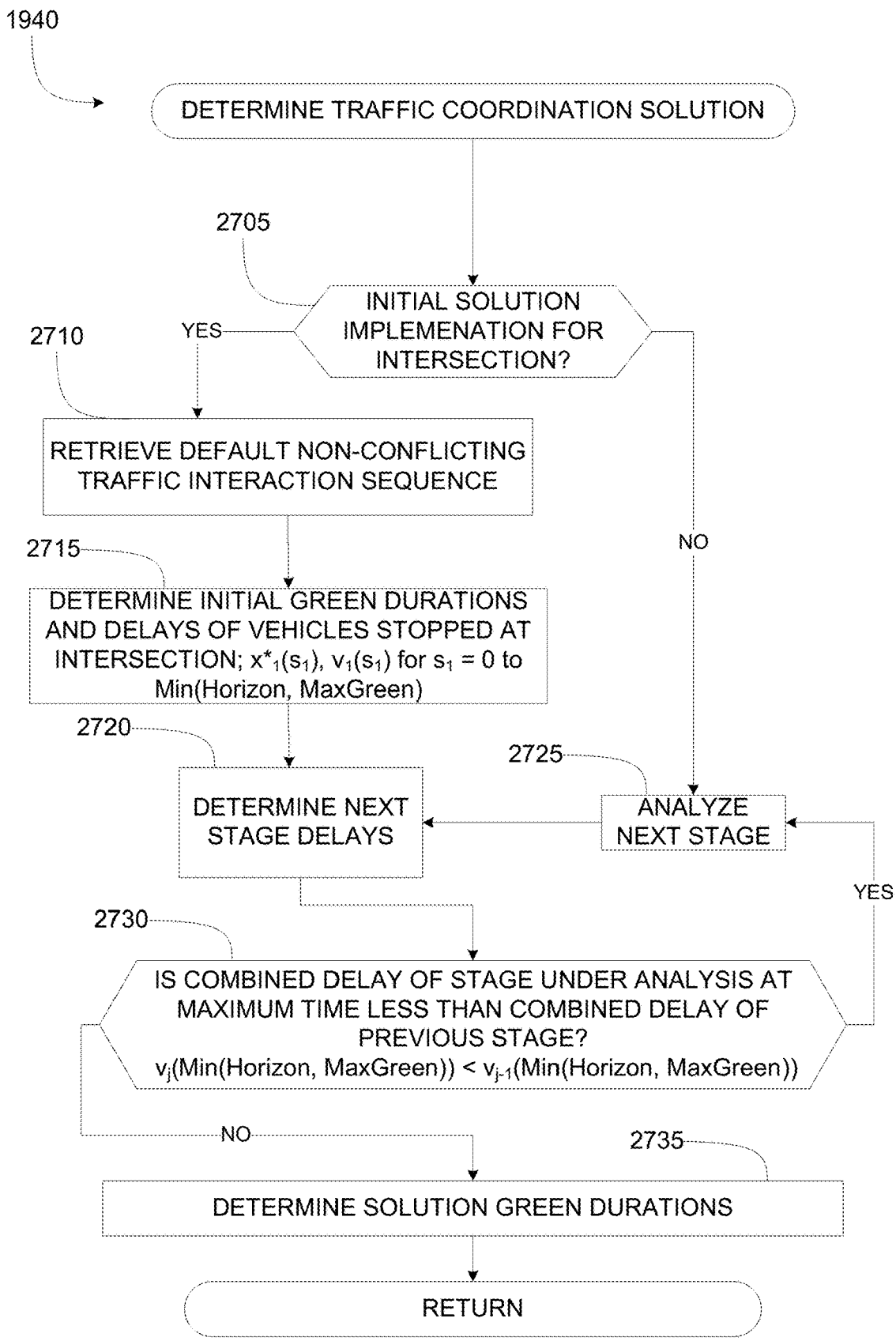
FIG. 27 is a flowchart representative of example machine-readable instructions that may be executed to implement block 1940 of the example machine-readable instructions of FIG. 19.

FIG. 27 is a flowchart representative of example machine-readable instructions that may be executed to implement block 1940 of the example machine-readable instructions of FIG. 19 to determine a traffic coordination solution for the intersection. The example traffic interaction sequencer 328 of FIG. 3 determines whether the traffic coordination solution to be implemented is the initial traffic coordination solution implementation (e.g., a previous traffic coordination solution has not been developed) for the intersection (block 2705).

If the traffic interaction sequencer 328 determines that the traffic coordination solution to be implemented is the initial traffic coordination solution implementation for the intersection (block 2705), the traffic interaction sequencer 328 retrieves a default non-conflicting traffic interaction sequence (block 2710). Next, the traffic interaction sequencer 328 determines the initial stage green durations and delays of vehicles stopped at the intersection (e.g., $x^*_1(s_1)$ and $v_1(s_1)$ of FIG. 14 for $s_1=0$ to the lesser of the analysis horizon or a maximum green duration) (block 2715). Then, the traffic interaction sequencer 328 determines the delays of vehicles for the next stage (block 2720).

If the example traffic interaction sequencer 328 determines that the traffic coordination solution to be implemented is not the initial traffic coordination solution implementation for the intersection (block 2705), the traffic interaction sequencer 328 analyzes a next stage (block 2725). Then, the instructions progress to block 2720 to determine delays of vehicles for the next stage.

After determining the delays of vehicles for the next stage (block 2720), the traffic interaction sequencer 328 determines whether the combined delays of the stage under analysis at a maximum time are less than the combined delays of the previous stage under analysis at the maximum time (e.g., where j is a stage number, $v_j$ of the lesser of the analysis horizon or a maximum green duration is less than $v_{j-1}$ lesser of the analysis horizon or a maximum green duration) (block 2730).

If the traffic interaction sequencer 328 determines that the combined delays of the stage under analysis at a maximum time are less than the combined delays of the previous stage under analysis at the maximum time (block 2730), the traffic interaction sequencer 328 determines green durations for the traffic coordination solution (block 2735). The instructions 1940 of FIG. 27 end and control returns to block 1945 of FIG. 19.

If the traffic interaction sequencer 328 determines that the combined delays of the stage under analysis at a maximum time are not less than the combined delays of the previous stage under analysis at the maximum time (block 2730), the instructions return to block 2725.

Figure 28:
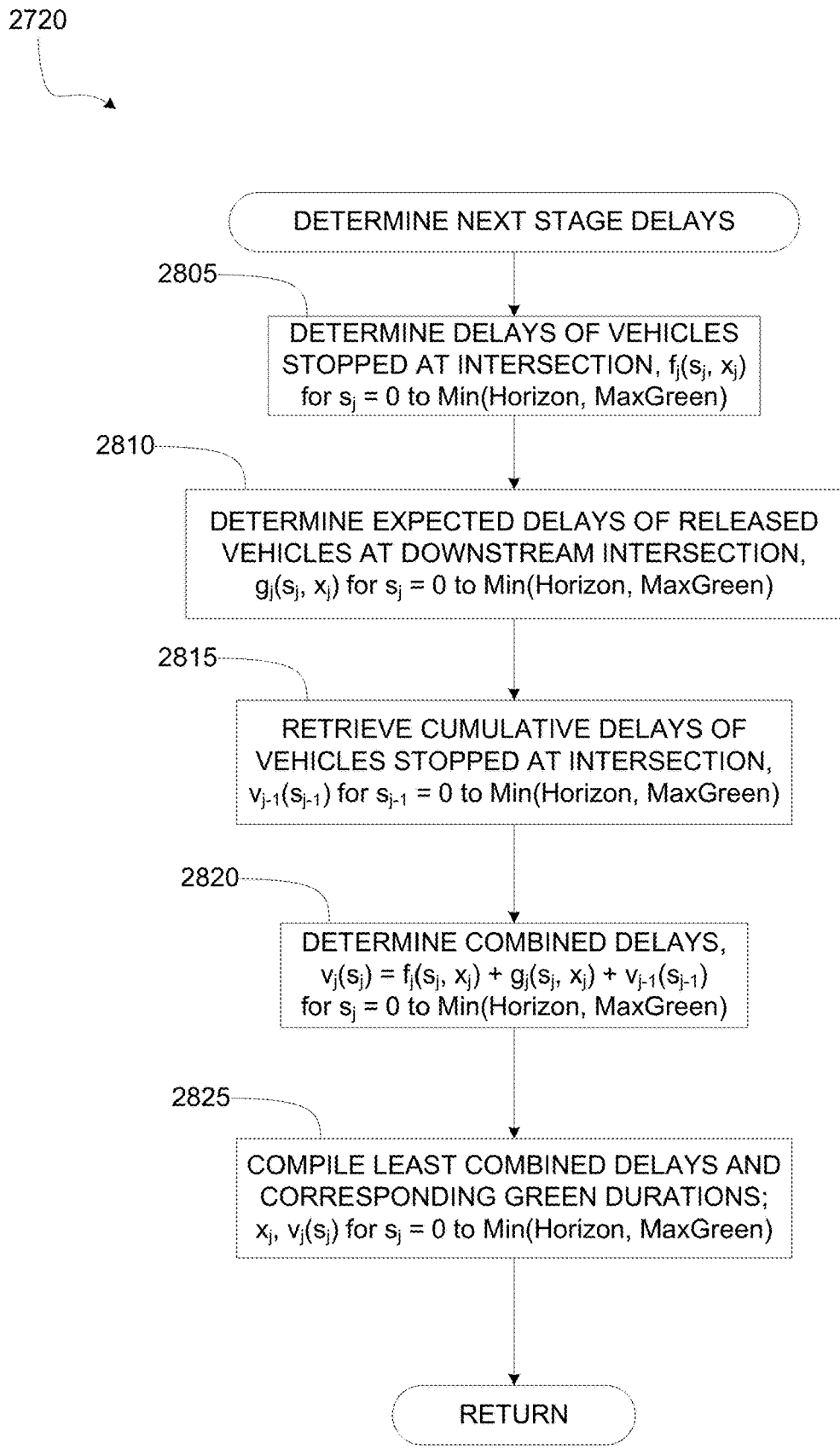
FIG. 28 is a flowchart representative of example machine-readable instructions that may be executed to implement block 2720 of the example machine-readable instructions of FIG. 27.

FIG. 28 is a flowchart representative of example machine-readable instructions that may be executed to implement block 2720 of the example machine-readable instructions of FIG. 27 to determine delays of vehicles for the next stage. The example traffic interaction sequencer 328 determines delay(s) of vehicle(s) stopped at the intersection (e.g., where j is the stage number, $f_j(s_j, x_j)$ for $s_j=0$ to the lesser of the analysis horizon or a maximum green duration of Equation 4) (block 2805). Then, the traffic interaction sequencer 328 determines expected delay(s) of released vehicle(s) at a downstream intersection (e.g., where j is the stage number, $g_j(s_j, x_j)$ for $s_j=0$ to the lesser of the analysis horizon or a maximum green duration of Equation 5) (block 2810). Next, the traffic interaction sequencer 328 retrieves cumulative delay(s) of vehicle(s) stopped at the intersection (e.g., where j is the stage number, $v_{j-1}(s_{j-1})$ for $s_{j-1}=0$ to the lesser of the analysis horizon or a maximum green duration of Equations 2 and 6) (block 2815). Then, the traffic interaction sequencer 328 determines the combined delays of vehicles stopped at and released from the intersection (e.g., where j is the stage number, $v_j(s_j)=f_j(s_j, x_j)+g_j(s_j, x_j)+v_{j-1}(s_{j-1})$ for $s_j=0$ to the lesser of the analysis horizon or a maximum green duration of Equation 6) (block 2820). Next, the traffic interaction sequencer 328 compiles the least combined delays and corresponding green durations (e.g., where j is the stage number, the least $vj(sj)$ and paired $xj$ for $sj=0$ to the lesser of the analysis horizon or a maximum green duration of Equation 6) (block 2825). The instructions 2720 of FIG. 28 end and control returns to block 2730 of FIG. 27.

Figure 29:
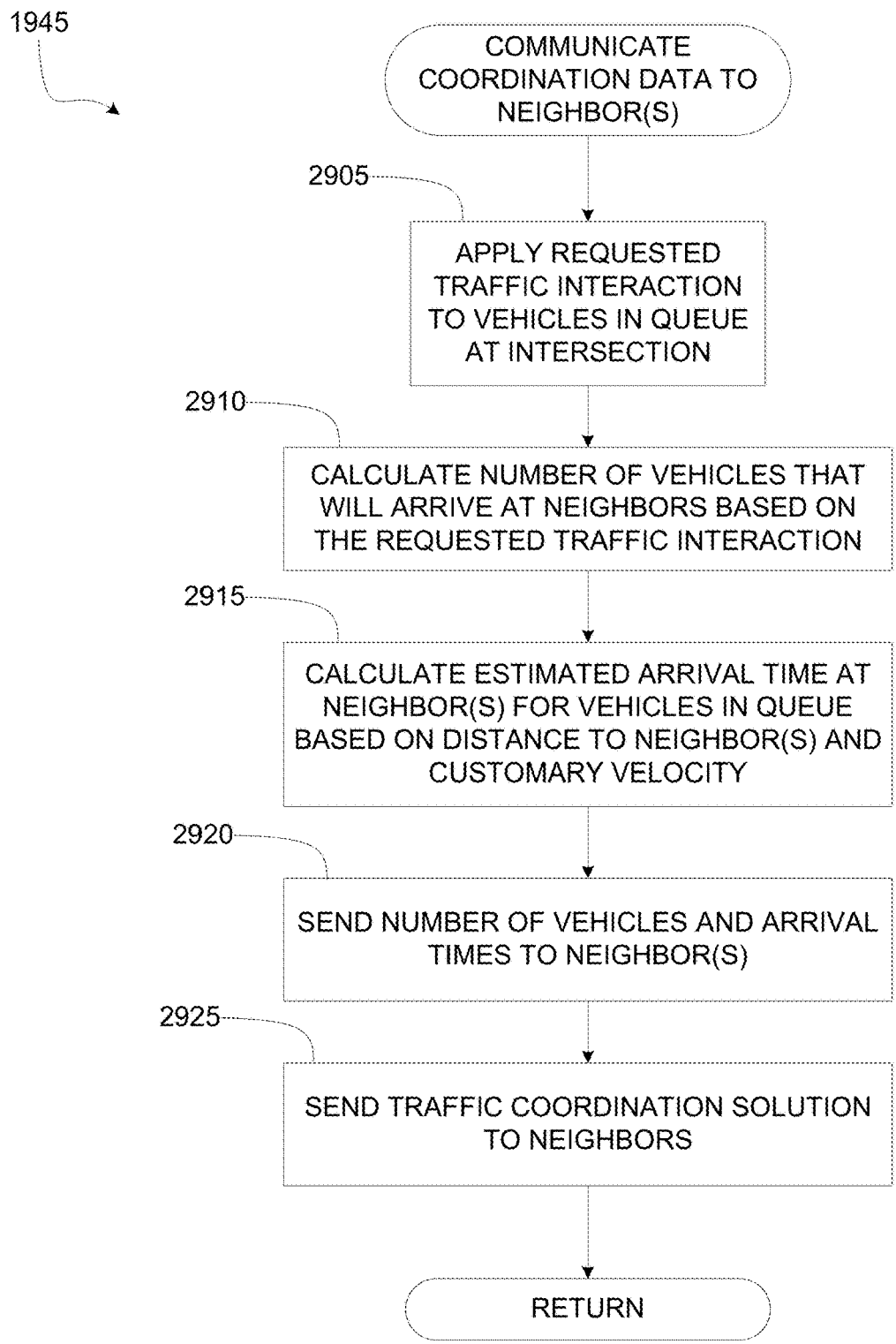
FIG. 29 is a flowchart representative of example machine-readable instructions that may be executed to implement block 1945 of the example machine-readable instructions of FIG. 19.

FIG. 29 is a flowchart representative of example machine-readable instructions that may be executed to implement block 1945 of the example machine-readable instructions of FIG. 19 to communicate traffic coordination data to neighboring UAVs. The example traffic interaction sequencer 328 applies requested traffic interactions to vehicles in the traffic queues of the intersection (block 2905). Then, the traffic interaction sequencer 328 determines a number of vehicles that will arrive at a neighboring downstream intersection based on the requested traffic interaction (block 2910). Next, the traffic interaction sequencer 328 estimates arrival times at the neighboring downstream intersection of the vehicles based on a third distance to the neighboring intersection and a customary velocity (e.g., a speed limit, etc.) (block 2915). Then, the traffic interaction sequencer 328 sends the number of vehicles and estimated arrival time(s) to the neighboring downstream intersection (e.g., the second UAV 118) via the example communication interface 230 (e.g., of the first UAV 116) (block 2920). Next, the traffic interaction sequencer 328 sends the traffic coordination solution to the neighboring downstream intersection via the communication interface 230 (block 2925). The instructions 1945 of FIG. 29 end and control returns to block 1950 of FIG. 19.

Figure 30:
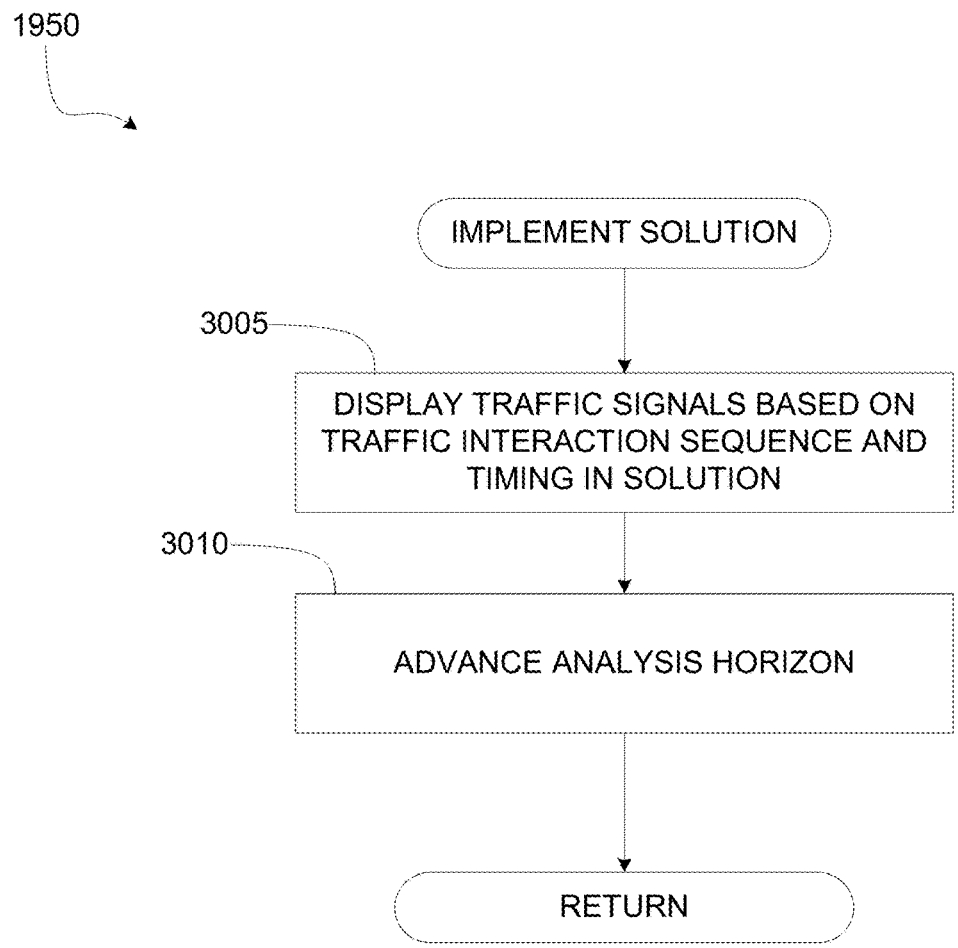
FIG. 30 is a flowchart representative of example machine-readable instructions that may be executed to implement block 1950 of the example machine-readable instructions of FIG. 19.

FIG. 30 is a flowchart representative of example machine-readable instructions that may be executed to implement block 1950 of the example machine-readable instructions of FIG. 19 to implement the traffic coordination solution for the intersection. The example traffic director 330 displays traffic signals based on the traffic coordination solution (block 3005). Next, the traffic director 330 advances the analysis horizon (block 3010). The instructions 1950 of FIG. 30 end and control returns to block 1905 of FIG. 19.

Figure 31:
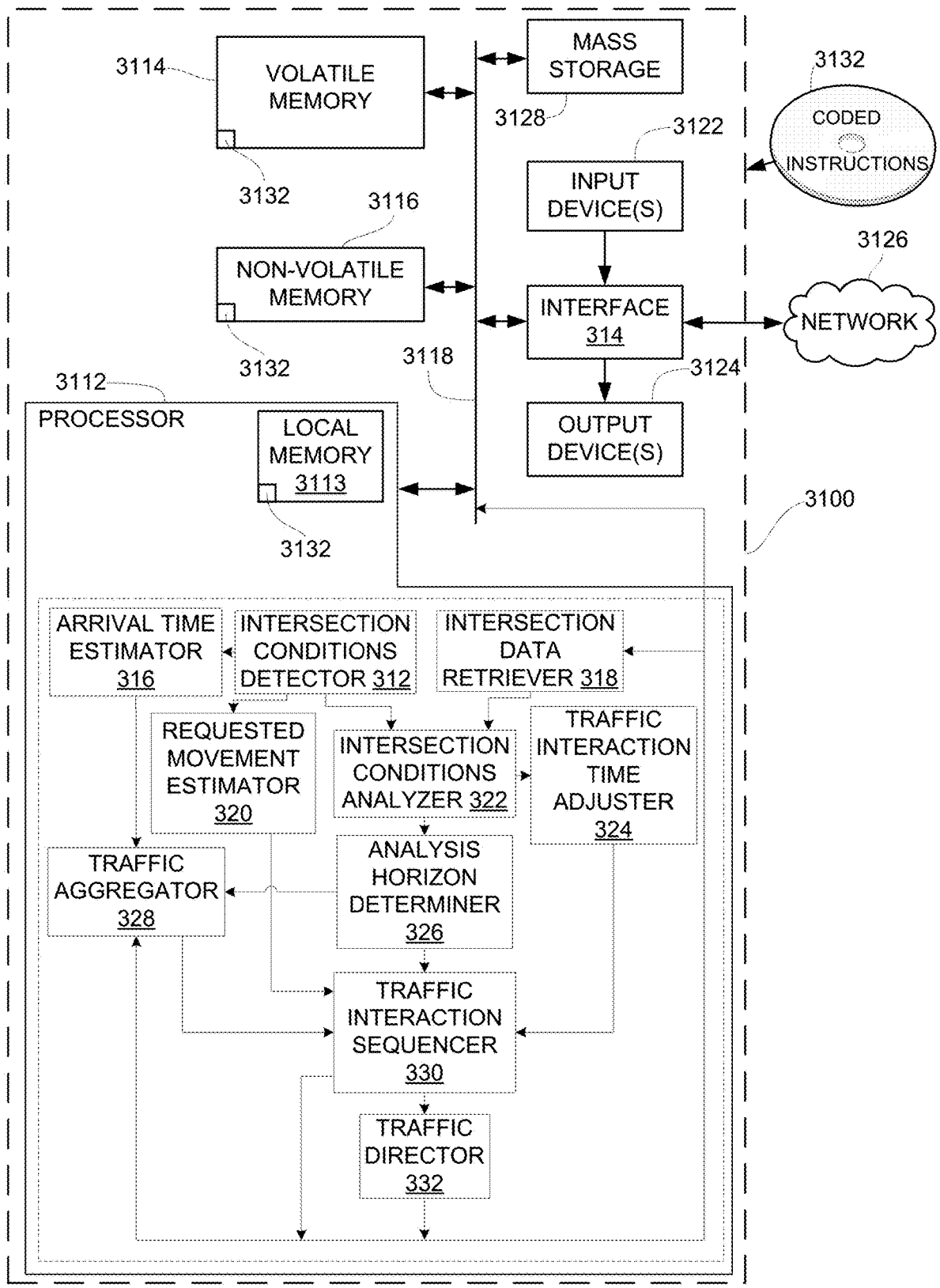
FIG. 31 is a block diagram of an example processor platform capable of executing the instructions of FIGS. 19-31 to implement the example traffic manager of FIGS. 2 and/or 3.

FIG. 31 is a block diagram of an example processor platform 3100 capable of executing the instructions of FIGS. 19-30 to implement the traffic manager 212 of FIGS. 2-3 The processor platform 3100 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 3100 of the illustrated example includes a processor 3112. The processor 3112 of the illustrated example is hardware. For example, the processor 3112 can be implemented by one or more integrated circuits, logic circuits, microprocessors or controllers from any desired family or manufacturer.

The processor 3112 of the illustrated example includes a local memory 3113 (e.g., a cache). The processor 3112 of the illustrated example also includes the intersection conditions detector 312, the arrival time estimator 314, the intersection data retriever 316, the requested movement estimator 318, the intersection conditions analyzer 320, the traffic interaction time adjuster 322, the analysis horizon determiner 324, the traffic aggregator 326, the traffic interaction sequencer 328, and the traffic director 330. The processor 3112 of the illustrated example is in communication with a main memory including a volatile memory 3114 and a non-volatile memory 3116 via a bus 3118. The volatile memory 3114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 3116 may be implemented by flash memory and/or any other desired type of memory device. Access to the main memory 3114, 3116 is controlled by a memory controller.

The processor platform 3100 of the illustrated example also includes the communication interface 230 of FIGS. 2-3. The communication interface 230 may be implemented by any type of interface standard, such as an Ethernet interface, a universal serial bus (USB), and/or a PCI express interface.

In the illustrated example, one or more input devices 3122 are connected to the communication interface 230. The input device(s) 3122 permit(s) a user to enter data and commands into the processor 3112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 3124 are also connected to the communication interface 230 of the illustrated example. The output devices 3124 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The communication interface 230 of the illustrated example, thus, typically includes a graphics driver card, a graphics driver chip or a graphics driver processor.

The communication interface 230 of the illustrated example also includes a communication device such as a transmitter, a receiver, a transceiver, a modem and/or network interface card to facilitate exchange of data with external machines (e.g., computing devices of any kind) via a network 3126 (e.g., an Ethernet connection, a digital subscriber line (DSL), a telephone line, coaxial cable, a cellular telephone system, etc.).

The processor platform 3100 of the illustrated example also includes one or more mass storage devices 3128 for storing software and/or data. Examples of such mass storage devices 3128 include floppy disk drives, hard drive disks, compact disk drives, Blu-ray disk drives, RAID systems, and digital versatile disk (DVD) drives.

The coded instructions 3132 of FIGS. 19-30 may be stored in the mass storage device 3128, in the volatile memory 3114, in the non-volatile memory 3116, and/or on a removable tangible computer readable storage medium such as a CD or DVD.

From the foregoing, it will be appreciated that the above disclosed methods, apparatus and articles of manufacture may facilitate traffic coordination between intersections of a roadway network, thus conserving vehicle energy resources (e.g., gasoline) and motorists' time. For example, vehicle traffic may operate inefficiently if a traffic signal at a controlled signal fails (e.g., due to power failure). Further, the above disclosed methods, apparatus and articles of manufacture may augment an existing traffic management network in response to a temporary high traffic event (e.g., a concert, a sporting event, etc.). By providing the ability to deploy traffic signals when needed (e.g., on demand), the resources needed to build and deploy fixed traffic signals are reduced. Additionally the above disclosed methods, apparatus and articles of manufacture may promptly replace inoperative existing traffic signals, thus improving motorist safety. Moreover, the above disclosed methods, apparatus and articles of manufacture provide an on-demand smart traffic signal system that may improve traffic flow efficiency through a roadway network.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Example 1 includes an unmanned aerial vehicle comprising: a housing; a rotor to lift the housing off ground; a motor to drive the rotor; a sensor to monitor traffic; a traffic signal carried by the housing; and a processor to control the traffic signal based on the traffic monitored by the sensor.

Example 2 includes the unmanned aerial vehicle of example 1, wherein the sensor includes at least one of a camera, a radio detection and ranging (RADAR) system, a global positioning satellite (GPS) receiver, a hygrometer, or a light detection and ranging (LIDAR) system.

Example 3 includes the unmanned aerial vehicle of example 1, wherein the processor is further to control the traffic signal based on at least one of data from a second unmanned aerial vehicle or data from a central facility.

Example 4 includes the unmanned aerial vehicle of example 3, wherein the processor is further to generate a traffic coordination solution from a default traffic interaction sequence based on at least one of the traffic monitored by the sensor, the data from a second unmanned aerial vehicle, or the data from a central facility.

Example 5 includes the unmanned aerial vehicle of example 4, wherein the processor is to control the traffic signal according to the traffic coordination solution.

Example 6 includes the unmanned aerial vehicle of example 1, further including a projector to project information on the ground.

Example 7 includes the unmanned aerial vehicle of example 1, further including a coupler to secure the unmanned aerial vehicle to a utility pole.

Example 8 includes the unmanned aerial vehicle of example 7, wherein the coupler is to secure the unmanned aerial vehicle to the utility pole in at least one of a perching position or a hanging position.

Example 9 includes the unmanned aerial vehicle of example 7, wherein the coupler includes at least one of an inductive coupling or a conductive coupling to receive energy from the utility pole.

Example 10 includes the unmanned aerial vehicle of example 1, further including at least one of a transmitter, a receiver, or a transceiver carried by the housing, the at least one of the transmitter, the receiver, or the transceiver to communicate with a second unmanned aerial vehicle via at least one of a point-to-point wireless connection or a network.

Example 11 includes the unmanned aerial vehicle of example 10, wherein the at least one of the transmitter, the receiver, and the transceiver is to communicate with a non-aerial vehicle on a roadway.

Example 12 includes the unmanned aerial vehicle of example 1, wherein the traffic signal is movable between a stowed position and a deployed position.

Example 13 includes an apparatus comprising: an intersection conditions detector to detect a first vehicle queue stopped at an intersection, an oncoming vehicle arriving at the intersection from an upstream intersection, and a second vehicle queue stopped at a downstream intersection; an arrival time estimator determine an estimated arrival time of the oncoming vehicle; an intersection conditions analyzer to determine a first distance between the intersection and an end of the second vehicle queue; a traffic interaction time adjuster to determine a length of the second vehicle queue based on the first distance, determine a downstream saturation level based on the first distance, and modify a maximum green light duration of a traffic interaction of the intersection based on the downstream saturation level; a traffic aggregator to determine a traffic aggregate for the intersection based on the first vehicle queue, the estimated arrival time of the oncoming vehicle, and a received estimated arrival time set for a third vehicle queue stopped at the upstream intersection; and a traffic interaction sequencer to determine a vehicle delay performance measure of the intersection based on the traffic aggregate, retrieve a cumulative vehicle performance delay measure of the intersection based on a previous traffic aggregate, determine an expected vehicle performance delay measure of the downstream intersection based on the length of the second vehicle queue and the downstream saturation level, and determine a modified green light duration of the traffic interaction based on the vehicle performance delay measure of the intersection, the cumulative vehicle performance delay measure of the intersection, and the expected vehicle performance delay measure of the downstream intersection.

Example 14 includes the apparatus of example 13, wherein at least one of the intersection conditions detector, the intersection conditions analyzer, the arrival time estimator, the traffic interaction time adjuster, the traffic aggregator, and the traffic interaction sequencer is carried by an unmanned aerial vehicle.

Example 15 includes the apparatus of example 14, wherein the unmanned aerial vehicle is a first unmanned aerial vehicle and the received estimated arrival time set for the third vehicle queue stopped at the upstream intersection is communicated to the first unmanned aerial vehicle from one or more of a central facility or a second unmanned aerial vehicle at the upstream intersection.

Example 16 includes the apparatus of example 13, wherein the intersection conditions detector is further to detect intersection conditions of the intersection including at least one of a light quantity at the intersection, an air humidity quantity at the intersection, or a blocked lane of the intersection.

Example 17 includes the apparatus of example 16, wherein the traffic interaction is one of a plurality of traffic interactions included in a traffic interaction sequence and wherein the traffic interaction sequencer is to modify green light durations of the plurality of traffic interactions to generate a traffic coordination solution.

Example 18 includes the apparatus of example 17, further including an analysis horizon determiner to determine an analysis horizon for the traffic coordination solution based on the intersection conditions.

Example 19 includes the apparatus of example 16, wherein traffic interaction is a first traffic interaction and the intersection conditions analyzer is further to disable a second traffic interaction based on the intersection conditions.

Example 20 includes the apparatus of example 19, wherein the intersection conditions analyzer reduces a maximum green light duration of the second traffic interaction to zero to disable the traffic interaction.

Example 21 includes the apparatus of example 13, wherein the intersection conditions detector is to detect a requested vehicle movement indicator of the oncoming vehicle.

Example 22 includes the apparatus of example 21, wherein the requested vehicle movement indicator includes at least one of a turn signal, a lane of the intersection, or a message from the oncoming vehicle.

Example 23 includes the apparatus of example 21, further including a requested movement estimator to determine an estimated requested vehicle movement of the oncoming vehicle based on the requested vehicle movement indicator.

Example 24 includes the apparatus of example 23, wherein the traffic interaction sequencer is to determine the vehicle performance delay measure of the intersection based on the estimated requested vehicle movement.

Example 25 includes the apparatus of example 13, further including a communication interface to communicate the modified green light duration of the traffic interaction to at least one of a central facility or an unmanned aerial vehicle at the upstream intersection.

Example 26 includes the apparatus of example 13, further including a traffic director to direct a display of a green light to the intersection based on the modified green light duration of the traffic interaction.

Example 27 includes the apparatus of example 26, wherein the traffic director is further to generate a traffic information message based on the modified green light duration of the traffic interaction.

Example 28 includes the apparatus of example 27, wherein the traffic information message is a visual roadway display.

Example 29 includes the apparatus of example 27, wherein the traffic information message is electronically transmitted to a road vehicle.

Example 30 includes a method comprising: deploying an unmanned aerial vehicle including a traffic signal to an intersection in response to a traffic event; and directing traffic at the intersection with the traffic signal.

Example 31 includes the method of example 30, wherein the unmanned aerial vehicle includes a coupler and deploying the unmanned aerial vehicle to the intersection in response to the traffic event includes coupling the unmanned aerial vehicle to a fixed structure located at the intersection with the coupler.

Example 32 includes the method of example 31, wherein coupling the unmanned aerial vehicle to the fixed structure located at the intersection with the coupler includes hanging the unmanned aerial vehicle from the fixed structure.

Example 33 includes the method of example 31, wherein coupling the unmanned aerial vehicle to the fixed structure located at the intersection with the coupler includes perching the unmanned aerial vehicle on the fixed structure.

Example 34 includes the method of example 31, wherein the fixed structure is a utility pole.

Example 35 includes the method of example 34, further including drawing energy from the utility pole with the coupler.

Example 36 includes the method of example 35, wherein the coupler includes at least one of an inductive coupling and a conductive coupling.

Example 37 includes the method of example 30, wherein the unmanned aerial vehicle includes a sensor and wherein directing traffic at the intersection with the traffic signal includes monitoring the traffic at the intersection with the sensor.

Example 38 includes the method of example 37 wherein the sensor includes at least one of a camera, a radio detection and ranging (RADAR) system, a global positioning satellite (GPS) receiver, a hygrometer, or a light detection and ranging (LIDAR) system.

Example 39 includes the method of example 37, wherein the unmanned aerial vehicle includes a processor and wherein directing traffic at the intersection with the traffic signal includes generating a traffic coordination solution for the intersection with the processor based on at least one of the traffic monitored by the sensor, data from a second unmanned aerial vehicle, or data from a central facility.

Example 40 includes the method of example 39, wherein generating the traffic coordination solution for the intersection with the processor based on at least one of the traffic monitored by the sensor, data from the second unmanned aerial vehicle, or data from the central facility includes determining, with the processor, a vehicle performance delay of the intersection for a stage of the traffic coordination solution and determining an expected vehicle performance delay of a second intersection for the stage of the traffic coordination solution.

Example 41 includes the method of example 40, wherein generating the traffic coordination solution for the intersection with the processor based on at least one of the traffic monitored by the sensor, data from the second unmanned aerial vehicle, or data from the central facility includes modifying a traffic interaction sequence based on the vehicle performance delay of the intersection and the expected vehicle performance delay of the second intersection.

Example 42 includes the method of example 41, wherein modifying the traffic interaction sequence based on the vehicle performance delay of the intersection and the expected vehicle performance delay of the second intersection includes modifying a green light duration of a traffic interaction included in the traffic interaction sequence.

Example 43 includes the method of example 39, wherein the unmanned aerial vehicle includes a communicator and further including communicating the traffic coordination solution to at least one of a central facility or the second unmanned aerial vehicle.

Example 44 includes the method of example 39, further including communicating a traffic information message based on the traffic coordination solution to a non-aerial vehicle with the communicator.

Example 45 includes the method of example 44, wherein the unmanned aerial vehicle includes a projector and wherein communicating the traffic information message based on the traffic coordination solution includes displaying the traffic information message on a roadway with the projector.

Example 46 includes the method of example 39, wherein directing traffic at the intersection with the traffic signal includes displaying a green light with the traffic signal to the intersection based on the traffic coordination solution.

Example 47 includes a tangible computer readable storage medium comprising computer readable instructions which, when executed, cause a processor to at least: detect a first vehicle queue stopped at an intersection, an oncoming vehicle arriving at the intersection from an upstream intersection, and a second vehicle queue stopped at a downstream intersection; determine an estimated arrival time of the oncoming vehicle; determine a first distance between the intersection and an end of the second vehicle queue; determine a length of the second vehicle queue based on the first distance, determine a downstream saturation level based on the first distance, and modify a maximum green light duration of a traffic interaction of the intersection based on the downstream saturation level; determine a traffic aggregate for the intersection based on the first vehicle queue, the estimated arrival time of the oncoming vehicle, and a received estimated arrival time set for a third vehicle queue stopped at the upstream intersection; and determine a vehicle delay performance measure of the intersection based on the traffic aggregate, retrieve a cumulative vehicle performance delay measure of the intersection based on a previous traffic aggregate, determine an expected vehicle performance delay measure of the downstream intersection based on the length of the second vehicle queue and the downstream saturation level, and determine a modified green light duration of the traffic interaction based on the vehicle performance delay measure of the intersection, the cumulative vehicle performance delay measure of the intersection, and the expected vehicle performance delay measure of the downstream intersection.

Example 48 includes the computer readable storage medium of example 47, wherein the computer readable storage medium is carried by an unmanned aerial vehicle.

Example 49 includes the computer readable storage medium of example 48, wherein the unmanned aerial vehicle is a first unmanned aerial vehicle and the received estimated arrival time set for the third vehicle queue stopped at the upstream intersection is communicated to the first unmanned aerial vehicle from one or more of a central facility or a second unmanned aerial vehicle at the upstream intersection.

Example 50 includes the computer readable storage medium of example 47, further including instructions to detect intersection conditions of the intersection including at least one of a light quantity at the intersection, an air humidity quantity at the intersection, or a blocked lane of the intersection.

Example 51 includes the computer readable storage medium of example 50, wherein the traffic interaction is one of a plurality of traffic interactions included in a traffic interaction sequence and further including instructions to modify green light durations of the plurality of traffic interactions to generate a traffic coordination solution.

Example 52 includes the computer readable storage medium of example 51, further including instructions to determine an analysis horizon for the traffic coordination solution based on the intersection conditions.

Example 53 includes the computer readable storage medium of example 50, wherein the traffic interaction is a first traffic interaction and further including instructions to disable a second traffic interaction based on the intersection conditions.

Example 54 includes the computer readable storage medium of example 53, wherein the instructions to disable the second traffic interaction based on the intersection conditions include instructions to reduce a maximum green light duration of the second traffic interaction to zero to disable the traffic interaction.

Example 55 includes the computer readable storage medium of example 47, further including instructions to detect a requested vehicle movement indicator of the oncoming vehicle.

Example 56 includes the computer readable storage medium of example 55, wherein the requested vehicle movement indicator includes at least one of a turn signal, a lane of the intersection, and a message from the oncoming vehicle.

Example 57 includes the computer readable storage medium of example 55, further including instructions to determine an estimated requested vehicle movement of the oncoming vehicle based on the requested vehicle movement indicator.

Example 58 includes the computer readable storage medium of example 57, wherein the instructions to determine the vehicle performance delay measure of the intersection are further based on the estimated requested vehicle movement.

Example 59 includes the computer readable storage medium of example 47, further including instructions to communicate the modified green light duration of the traffic interaction to at least one of a central facility or an unmanned aerial vehicle at the second intersection.

Example 60 includes the computer readable storage medium of example 47, further including instructions to direct a display of a green light to the intersection based on the modified green light duration of the traffic interaction.

Example 61 includes the computer readable storage medium of example 47, further including instructions to generate a traffic information message based on the modified green light duration of the traffic interaction.

Example 62 includes the computer readable storage medium of example 61, wherein the traffic information message is a visual roadway display.

Example 63 includes the computer readable storage medium of example 61, wherein the traffic information message is electronically transmitted to a road vehicle.

What is claimed is:

1. An unmanned aerial vehicle comprising:
a housing;
a rotor to lift the housing off ground;
a motor to drive the rotor;
a coupler, carried by the housing, to secure the unmanned aerial vehicle to a stationary structure, the coupler to wrap around at least a portion of a circumferential exterior of an elongate member of the stationary structure, the coupler to simultaneously engage at least two points on opposite sides of the elongate member;
a sensor to monitor traffic;
a traffic signal carried by the housing; and
a processor to control the traffic signal based on the traffic monitored by the sensor.

2. The unmanned aerial vehicle of claim 1, wherein the sensor includes at least one of a camera, a radio detection and ranging (RADAR) system, a global positioning satellite (GPS) receiver, a hygrometer, or a light detection and ranging (LIDAR) system.

3. The unmanned aerial vehicle of claim 1, wherein the processor is further to control the traffic signal based on at least one of data from a second unmanned aerial vehicle or data from a central facility.

4. The unmanned aerial vehicle of claim 3, wherein the processor is further to generate a traffic coordination solution from a default traffic interaction sequence based on at least one of the traffic monitored by the sensor, the data from the second unmanned aerial vehicle, or the data from the central facility.

5. The unmanned aerial vehicle of claim 4, wherein the processor is to control the traffic signal according to the traffic coordination solution.

6. The unmanned aerial vehicle of claim 1, further including a projector to project information on the ground.

7. The unmanned aerial vehicle of claim 1, wherein the elongate member of the stationary structure corresponds to at least one of a utility pole, a light pole, a traffic signal pole, a telecommunications pole, a power pole, or a tree branch.

8. The unmanned aerial vehicle of claim 1, wherein the coupler is to secure the unmanned aerial vehicle to the stationary structure in at least one of a perching position or a hanging position.

9. The unmanned aerial vehicle of claim 1, wherein the coupler includes at least one of an inductive coupling or a conductive coupling to receive energy from the stationary structure.

10. The unmanned aerial vehicle of claim 1, further including at least one of a transmitter, a receiver, or a transceiver carried by the housing, the at least one of the transmitter, the receiver, or the transceiver to communicate with a second unmanned aerial vehicle via at least one of a point-to-point wireless connection or a network.

11. The unmanned aerial vehicle of claim 10, wherein the at least one of the transmitter, the receiver, and the transceiver is to communicate with a non-aerial vehicle on a roadway.

12. The unmanned aerial vehicle of claim 1, wherein the traffic signal is movable between a stowed position and a deployed position.

13. The unmanned aerial vehicle of claim 1, further including:
an intersection conditions detector to detect (1) a first vehicle queue stopped at an intersection, (2) an oncoming vehicle approaching the intersection from an upstream intersection, and (3) a second vehicle queue stopped at a downstream intersection;
an arrival time estimator to determine an estimated arrival time of the oncoming vehicle at the intersection;
an intersection conditions analyzer to determine a first distance between the intersection and an end of the second vehicle queue;
a traffic interaction time adjuster to:
determine a length of the second vehicle queue based on the first distance;
determine a downstream saturation level based on the first distance; and
modify a maximum green light duration of a traffic interaction of the intersection based on the downstream saturation level;
a traffic aggregator to determine a traffic aggregate for the intersection based on the first vehicle queue, the estimated arrival time of the oncoming vehicle, and a received estimated arrival time set for a third vehicle queue stopped at the upstream intersection; and
a traffic interaction sequencer to;
determine a first vehicle delay metric for the intersection based on the traffic aggregate;
determine a second vehicle delay metric for the downstream intersection based on the length of the second vehicle queue and the downstream saturation level; and
determine a modified green light duration of the traffic interaction based on the first vehicle delay for the intersection, and the second vehicle delay metric for the downstream intersection.

14. The unmanned aerial vehicle of claim 13, wherein at least one of the intersection conditions detector, the intersection conditions analyzer, the arrival time estimator, the traffic interaction time adjuster, the traffic aggregator, and the traffic interaction sequencer is carried by the housing of the unmanned aerial vehicle.

15. The unmanned aerial vehicle of claim 13, wherein the intersection conditions detector is further to detect intersection conditions of the intersection including at least one of a light quantity at the intersection, an air humidity quantity at the intersection, or a blocked lane of the intersection.

16. The unmanned aerial vehicle of claim 13, wherein the intersection conditions detector is to detect a requested vehicle movement indicator of the oncoming vehicle.

17. The unmanned aerial vehicle of claim 13, further including a communication interface to communicate the modified green light duration of the traffic interaction to at least one of a central facility or a second unmanned aerial vehicle at the upstream intersection.

18. The unmanned aerial vehicle of claim 13, further including a traffic director to direct a display of a green light to the intersection based on the modified green light duration of the traffic interaction.

19. A method comprising:
   deploying an unmanned aerial vehicle to an intersection in response to a traffic event, the unmanned aerial vehicle including:
      a housing;
      a rotor to lift the housing off ground;
      a motor to drive the rotor;
      a coupler, transported with the unmanned aerial vehicle, to secure the unmanned aerial vehicle to a fixed structure located at the intersection;
      a traffic signal carried by the housing; and
      a processor to control the traffic signal;
   gripping, with the coupler, a perimeter of an elongate member of the fixed structure, a first portion of the coupler to contact a first point on the elongate member while a second portion of the coupler contacts a second point on the elongate member, the first and second points of the elongate member facing in opposite directions; and
   directing traffic at the intersection with the traffic signal.

* * * * *